(12) United States Patent
Sanders et al.

(10) Patent No.: US 12,427,615 B2
(45) Date of Patent: Sep. 30, 2025

(54) EVEN OUT WEARING OF MACHINE COMPONENTS DURING MACHINING

(71) Applicant: Autodesk, Inc., San Francisco, CA (US)

(72) Inventors: Lee Sanders, Tamworth (GB); Akmal Ariff Bin Abu Bakar, London (GB)

(73) Assignee: Autodesk, Inc., San Francisco, CA (US)

( * ) Notice: Subject to any disclaimer, the term of this patent is extended or adjusted under 35 U.S.C. 154(b) by 873 days.

(21) Appl. No.: 17/477,420

(22) Filed: Sep. 16, 2021

(65) Prior Publication Data
US 2022/0080545 A1 Mar. 17, 2022

Related U.S. Application Data

(60) Provisional application No. 63/079,321, filed on Sep. 16, 2020.

(51) Int. Cl.
*B23Q 15/16* (2006.01)
*B23Q 17/09* (2006.01)
(Continued)

(52) U.S. Cl.
CPC ......... *B23Q 15/16* (2013.01); *B23Q 17/0966* (2013.01); *B23Q 17/0995* (2013.01);
(Continued)

(58) Field of Classification Search
CPC ...... B23Q 1/0009; B23Q 15/16; B23Q 17/09; B23Q 17/0966; B23Q 17/0995;
(Continued)

(56) References Cited

U.S. PATENT DOCUMENTS 4,620,281 A * 10/1986 Thompson ......... G05B 19/4065
73/104
5,802,937 A * 9/1998 Day ........................ B23B 25/06
82/134
(Continued)

FOREIGN PATENT DOCUMENTS

CA 2571275 A1 * 6/2007 ......... B23Q 17/2233
CN 105807715 A * 7/2016
(Continued)

OTHER PUBLICATIONS

Unknown author, "Autodesk Fusion 360—Software for CNC Machining," (Sep. 16, 2021) [online] (retrieved from https://www.autodesk.com/solutions/cnc-machining-software), 12 pages.
(Continued)

*Primary Examiner* — Crystal J Barnes-Bullock
(74) *Attorney, Agent, or Firm* — Fish & Richardson P.C.

(57) ABSTRACT

Methods, systems, and apparatus, including medium-encoded computer program products, for computer aided design and manufacture of physical structures using subtractive manufacturing systems and techniques include, in one aspect, a method including obtaining information regarding a geometry of a part to be machined by a computer-controlled manufacturing system from a workpiece; based on the information regarding the geometry, identifying machine components to be used by the computer-controlled manufacturing system during machining the part; determining a position for the machining of the part with respect to at least one of the machine components, to even out wear on the machine components, based on data indicating previous positions, movements and wear of components associated with the computer-controlled manufacturing system; and providing instructions usable by the computer-controlled manufacturing system, wherein the
(Continued)

instructions are configured to cause the computer-controlled manufacturing system to use the position for the machining.

30 Claims, 8 Drawing Sheets

(51) Int. Cl.
    *B23Q 17/10*         (2006.01)
    *B23Q 17/20*         (2006.01)
    *G06N 3/08*          (2023.01)

(52) U.S. Cl.
    CPC ............ *B23Q 17/10* (2013.01); *B23Q 17/20* (2013.01); *G06N 3/08* (2013.01)

(58) Field of Classification Search
    CPC .... B23Q 17/10; B23Q 17/20; B23Q 17/2233; B23Q 17/24; B23Q 17/24578; B23Q 17/249; B23Q 17/5574; B23B 25/06; B24B 49/003; B24B 49/14; G01B 21/04; G01B 21/045; G05B 19/182; G05B 19/40; G05B 19/404; G05B 19/4065; G06N 3/02; G06N 3/08; G06N 20/00
    USPC ........................................................ 700/175
    See application file for complete search history.

(56) References Cited

U.S. PATENT DOCUMENTS

| | | | | |
|---|---|---|---|---|
| 5,920,483 A * | 7/1999 | Greenwood | ....... | G05B 19/4083 700/193 |
| 5,949,685 A * | 9/1999 | Greenwood | ......... | G05B 19/404 700/71 |
| 6,980,881 B2 * | 12/2005 | Greenwood | ......... | G05B 19/401 318/560 |
| 8,543,237 B2 * | 9/2013 | Slettemoen | ............ | B23Q 17/24 700/192 |
| 8,999,136 B2 * | 4/2015 | Cantelli | .................... | B23H 9/10 205/651 |
| 10,884,392 B2 * | 1/2021 | Sanders | ............... | G05B 19/404 |
| 11,176,291 B2 * | 11/2021 | Mackman | ............... | G06F 30/20 |
| 11,609,550 B2 * | 3/2023 | Bond | ................. | B23Q 17/2233 |
| 11,822,308 B2 * | 11/2023 | Zhang | ................. | G05B 19/404 |
| 2008/0161959 A1 * | 7/2008 | Jerard | ................. | G05B 19/4065 700/110 |
| 2009/0099684 A1 * | 4/2009 | Roders | ............... | B23Q 17/2233 700/173 |
| 2012/0240386 A1 * | 9/2012 | Cantelli | .................... | B23H 9/00 29/33 R |
| 2022/0314336 A1 * | 10/2022 | Maier | .................. | B23Q 1/0009 |

FOREIGN PATENT DOCUMENTS

| | | | | |
|---|---|---|---|---|
| CN | 110888394 A | * | 3/2020 | ............. G05B 19/19 |
| DE | 102008058161 A1 | * | 5/2010 | ............... B23Q 1/70 |
| DE | 102016010064 B4 | * | 3/2020 | ......... G05B 13/0265 |
| DE | 20220012303 A | * | 9/2020 | |
| DE | 6836577 B2 | * | 12/2021 | ............ B23F 23/006 |
| DE | 6797331 B1 | * | 2/2023 | |
| EP | 1139189 B1 | * | 7/2013 | ........... G05B 19/401 |
| EP | 2924526 A1 | * | 9/2015 | ......... B23Q 17/0966 |
| JP | 112020007089 T5 | * | 12/2020 | |
| JP | 102020116893 A1 | * | 3/2021 | ............. B24B 49/00 |
| KR | 102019002054 A1 | * | 2/2022 | |
| WO | WO-2007090486 A1 | * | 8/2007 | ............. B23Q 17/09 |
| WO | WO-2018204410 A1 | * | 3/2020 | ......... G05B 13/0265 |
| WO | WO 2021225584 A1 | | 11/2021 | |

OTHER PUBLICATIONS

Yesawsi, "Modeling and Analysis of a CNC Milling Machine Bed with Nano Material (Graphene)," International Journal of Mechanical Engineering and Technology (IJMET), May 2017, 8(5):372-379.

* cited by examiner

EVEN OUT WEARING OF MACHINE COMPONENTS DURING MACHINING

CROSS-REFERENCE TO RELATED APPLICATION

This application claims the benefit of priority of earlier U.S. Application No. 63/079,321, entitled "EVEN OUT WEARING OF MACHINE COMPONENTS DURING MACHINING", and filed Sep. 16, 2020, which application is incorporated herein by reference in its entirety.

BACKGROUND

This specification relates to manufacturing of physical structures using subtractive manufacturing systems and techniques.

Subtractive manufacturing refers to any manufacturing process where three-dimensional (3D) parts are created from stock material (generally a "blank" or "workpiece" that is larger than the 3D part) by cutting away portions of the stock material. Such manufacturing processes typically involve the use of multiple Computer Numerical Control (CNC) machine where cutting tools are used to perform a series of operations. For example, a milling process can include a roughing operation, a semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured.

Computer Aided Design (CAD) software and Computer Aided Manufacturing (CAM) software have been developed and used to generate 3D representations of parts and to manufacture the physical structures of those parts, e.g., using CNC manufacturing techniques. CAD/CAM software can manage movements of the machinery to machine a part from a block of material positioned within a machining envelope through programming the CNC machine.

SUMMARY

This specification describes technologies relating to manufacturing physical structures with optimized usage of subtractive manufacturing systems and techniques. As used in this disclosure, "optimize" and variations thereof does not indicate that the best solution is found in all instances.

In general, one or more aspects of the subject matter described in this specification can be embodied in one or more methods that include: obtaining information regarding a geometry of a part to be machined by a computer-controlled manufacturing system from a workpiece; based on the information regarding the geometry, identifying a set of machine components to be used by the computer-controlled manufacturing system during machining the part from the workpiece; determining a position for the machining of the part with respect to at least one of the set of machine components, to even out wear on the set of machine components, based on data indicating previous positions, movements and wear of components associated with the computer-controlled manufacturing system; and providing instructions usable by the computer-controlled manufacturing system, wherein the instructions are configured to cause the computer-controlled manufacturing system to use the position for the machining to even out wear on the set of machine components.

The information regarding the geometry of the part to be machined can include a toolpath specification for the geometry of the part, a three-dimensional model of the geometry of the part, or both. The computer-implemented method can include generating at least a portion of the data indicating the previous positions, movements and wear of components. The generation can include tracking positions and movements of components associated with the computer-controlled manufacturing system; and collecting wear data for the components associated with the computer-controlled manufacturing system.

In some instances, the one or more method can further include: generating training data that tracks movement and velocity of a machining tool during machining of parts, wherein the tracking data is collected for points defined over a grid on a surface associated with at least one of the components; and in response to the training data, determining a correlation between i) increase in wear at points on the surface and ii) movement and velocity of the machining tool determined during machining at the respective points to be used to determine a position for the machining of the part on the surface associated with the at least one of the components.

Predicted wear of at least one of the components of a machine used for machining the part can be determined at points defined on a surface associated with the at least one of the components based on collected training data and initial wear of the at least one of the components. The training data can be a paired data set defined for the points on the surface associated with the at least one of the components.

Determining the position for the machining of the part with respect to the at least one of the set of machine components can be based on predicted wear of at least one of the components determined based on training data. The training data is used to learn a correlation between an increase in wear at specific points on a surface associated with the at least one of the components based on a determined number of times of a machining tool's crossing over the respective specific points and an average velocity experienced at the respective specific points based on machining using the machining tool of the computer-controlled manufacturing system.

The position for the machining of the part with respect to the at least one of the set of machine components can be determined based on a determined correlation between i) an increase in wear at a point on a surface associated with the at least one of the set of machine components and ii) movement and velocity of a machining tool during used to machine parts.

In some instances, the one or more methods can further include: training a neural network to predict an increase in wear at points on a surface associated with at least one of the components according to training data generated based on repeatedly machining the part from workpieces by using a machining tool; based on the information regarding the geometry including a toolpath specification usable by the computer-controlled manufacturing system to machine at least a portion of the geometry of the part from the workpiece, determining a number of times that the machining tool passes over the points on the surface associated with the at least one of the components and velocities associated with passing the machining tool through the points on the surface; and feeding information defining the number of times that the machining tool passes over the points to predict an increase in wear over the surface associated with the at least one of the components, wherein the position for the machining of the part is determined relative to the predicted increase in wear for the points on the surface.

Determining the position for the machining can include providing the information regarding the geometry and an identification of the set of machine components to a machine learning program to determine the position for the machining of the part. The machine learning program can be trained based on the data indicating the previous positions, the movements and the wear of components associated with the computer-controlled manufacturing system. The position for the machining of the part to even out wearing of the set of machine components is received from the machine learning program.

The information regarding the geometry of the part can be obtained at a computer-aided manufacturing program. The information regarding the geometry can include a toolpath specification usable by the computer-controlled manufacturing system to machine at least a portion of the geometry of the part from the workpiece, and the machine learning program includes an online reinforcement learning program. The computer-controlled manufacturing system can be a type of computer-controlled manufacturing system used in multiple locations. The online reinforcement learning program can receive the data from multiple instances of the computer-controlled manufacturing system operated at multiple locations.

In some instances, the position for the machining can indicate a new location in which to fixture the workpiece within a machining envelope of the computer-controlled manufacturing system so as to increase usage of the machining envelope and decrease uneven wear of a working bed included in the set of machine components.

The computer-implemented method can include: training a neural network using at least the data to generate machine-learning rules defining associations between positions of workpieces when machining in relation to one or more of components of the computer-controlled manufacturing system, wear of the components, induced forces reflected at the components.

Likewise, one or more aspects of the subject matter described in this specification can be embodied in one or more systems that include a data processing apparatus including at least one hardware processor and a non-transitory computer-readable medium encoding instructions of a computer-aided design or manufacturing program. The instructions being configured to cause the data processing apparatus to obtain information regarding a geometry of a part to be machined by a computer-controlled manufacturing system from a workpiece; based on the information regarding the geometry, identify a set of machine components to be used by the computer-controlled manufacturing system during machining the part from the workpiece; determine a position for the machining of the part with respect to at least one of the set of machine components, to even out wear on the set of machine components, based on data indicating previous positions, movements and wear of components associated with the computer-controlled manufacturing system; and provide instructions usable by the computer-controlled manufacturing system, wherein the instructions are configured to cause the computer-controlled manufacturing system to use the position for the machining to even out wear on the set of machine components.

Thus, as will be appreciated, the non-transitory, computer-readable medium can encode instructions configured to cause the data processing apparatus to perform the one or more methods, as detailed above and herein. Moreover, the system can include the computer-controlled manufacturing system.

Particular embodiments of the subject matter described in this specification can be implemented to realize one or more of the following advantages. In some instances, a part is machined from a workpiece that is a block of material, and during a manufacturing process performed at a CNC machine, the workpiece is positioned in a machining envelope where different axes are defined for moving machining tools in different directions to machine the part. The CNC machine may receive instructions from a CAD/CAM software, directly or indirectly, in relation to managing movements and positioning of the machine components (including machining tools, machining envelope, or other appropriate aspects) of the CNC machine with respect to the workpiece.

In some instances, when a part is machined, a workpiece can be positioned on a working table (or bed) of a CNC machine to machine the part based on movements performed by some of the machine components (such as, cutting tools) according to received instructions defined for machining the part based on a toolpath specification. The instructions for machining the part can be generated at a CAD/CAM software according to a geometry of the to-be-machined part. Based on the received instructions, the CNC machine and different machine components are engaged in performing defined operations for the geometry of the to-be machined part and cutting forces are applied to the workpiece during the machining. When cutting forces are applied, at least part of the CNC machine is subjected to a vibration corresponding to the cutting forces, their magnitude and direction. In some instances, the "life" of one or more of the cutting tools and machine components of the CNC machine can be defined as inversely proportional to a level of vibration to which the machine is subjected as a result of the applied forces during the machining.

In some instances, if a position (such as initial position) of a workpiece for machining a part is determined according to data indicating previous positions of workpieces, performed movements, and wear of components, rather than a random position or always at a fixed place, machine components may wear evenly thus resulting in an even wearing of the CNC machine as a whole and/or one or more of the machine components of the CNC machine. In addition, by defining positioning based on prediction logic for wear and tear of machine components, accuracy of operations may be maintained in a reliable way that can be monitored and measured to evaluate wear characteristics of the machine components of the CNC machine. Positioning of a workpiece on a working bed (or table) or positioning of a machine components may be defined objectively if the positioning is performed based on data indicative of previous positioning, movements, and wear characteristics of the machine components rather than relying upon the skills and experience of a user (e.g., a programmer of the CNC machine), or relying subjective interpretation of visible features indicating wearing, without taking into consideration expected wear of components due to the to-be-performed machining operations for the to-be-machined part or relevance of machine components when performing maintenance operations.

In some instances, some machine components of a CNC machine can be expensive to replace, thus prolonging their life reduces the costs for machining parts using such a CNC machine. Some types of CNC machines, may be associated with higher maintenance expenses than others. Further, when considering maintenance and life of a CNC machine, repairs or replacements of components of the CNC machine are associated with a time period when the CNC machine is non-operational. In such case, the manufacturing process can be slowed down and/or a higher number of CNC machines of a certain type in a manufacturing facility (or multiple facilities at different locations of a manufacturer) has to be maintained to accommodate a period when some of the machines are under maintenance and unavailable for production. Monitoring a level of wear of components of a CNC machine, and improving utilization of a machining envelope to even out wear of components may improve performance of the CNC machine, prolong life of the CNC machine, save cost for maintenance, improve resource planning to reduce resource spending at one or more manufacturing facilities, reduce prices for machining products, among other improvements. By determining a position for performing a next machining operation for a part with respect to at least some machine components, wear on the machine components can be evened out. A position for machining a part with respect to at least one of the machine components of the CNC machine may be automatically determined, based on, for example, simulation logic or prediction logic. Such logic for automatic determination of a position to even out wear of components, can be implemented as part of a machine learning program, to provide an improvement for resource spending (saves manual time adjustments, saves utilization of computing resources, provides longer usage of a machine).

In some instances, load on different CNC machines at one or more manufacturing facilities can be more evenly distributed to prolong the time of functioning of the CNC machines without a need for repairing or replacing a machine component due to wearing out. A CNC machine out of a number of CNC machines may be determined for a particular machining of a part based on expected wear of the machines in relation to the part. For example, by simulating wear of components of different CNC machines in relation to machining parts and taking into consideration data for level of wear of these different CNC machines, distribution of tasks for machining the parts at particular CNC machines can be done to keep a level of wear of multiple CNC machines even.

Further, by keeping wear characteristics of machine components to a relatively same level of wear over time, the accuracy of the machining may be maintained high compared to producing a part from a CNC machine where the components are at relatively different levels of wear. Some machine components can be associated with different accuracy performance at different levels of wear. When multiple components are also at different levels of wear and are involved in machining a single part, the accuracy of the performance of the machining may be lower and difficult to predict and tune. Therefore, tracking wear data for components can improve both resource spending in machine maintenance, time to market, and prices of final products, but also accuracy of machining can be improved by providing options to adjust machining configurations according to level of wear.

In some instances, when a part is provided for machining by a computer-controlled manufacturing system (e.g., CNC machine), the part is defined with a toolpath specification for the machining that is generated for a 3D model for the part. By determining machine components of the computer-controlled manufacturing system and evaluating data related to previous positions, movements and wear of components at the manufacturing system, a position for machining the part can be determined with respect to at least one of the machine components, to even out wear on the machine components when machining the part. In such case, the position is determined based on an objective criterion and can take the guess work out of determining an appropriate positioning for the operations performed over the workpiece when machining the part.

In some instances, by determining machine components of a computer-controlled manufacturing system of a certain type for machining a part provided for machining, data related to previous positions, movements and wear of components at multiple manufacturing systems of that type may be evaluated. Based on an evaluation, a manufacturing system from the multiple system can be selected and a position for machining the part can be determined with respect to at least one of the machine components of that manufacturing system, to even out wear on the machine components when machining the part at the particular machine, and to even out load and wear of components at the multiple machines.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
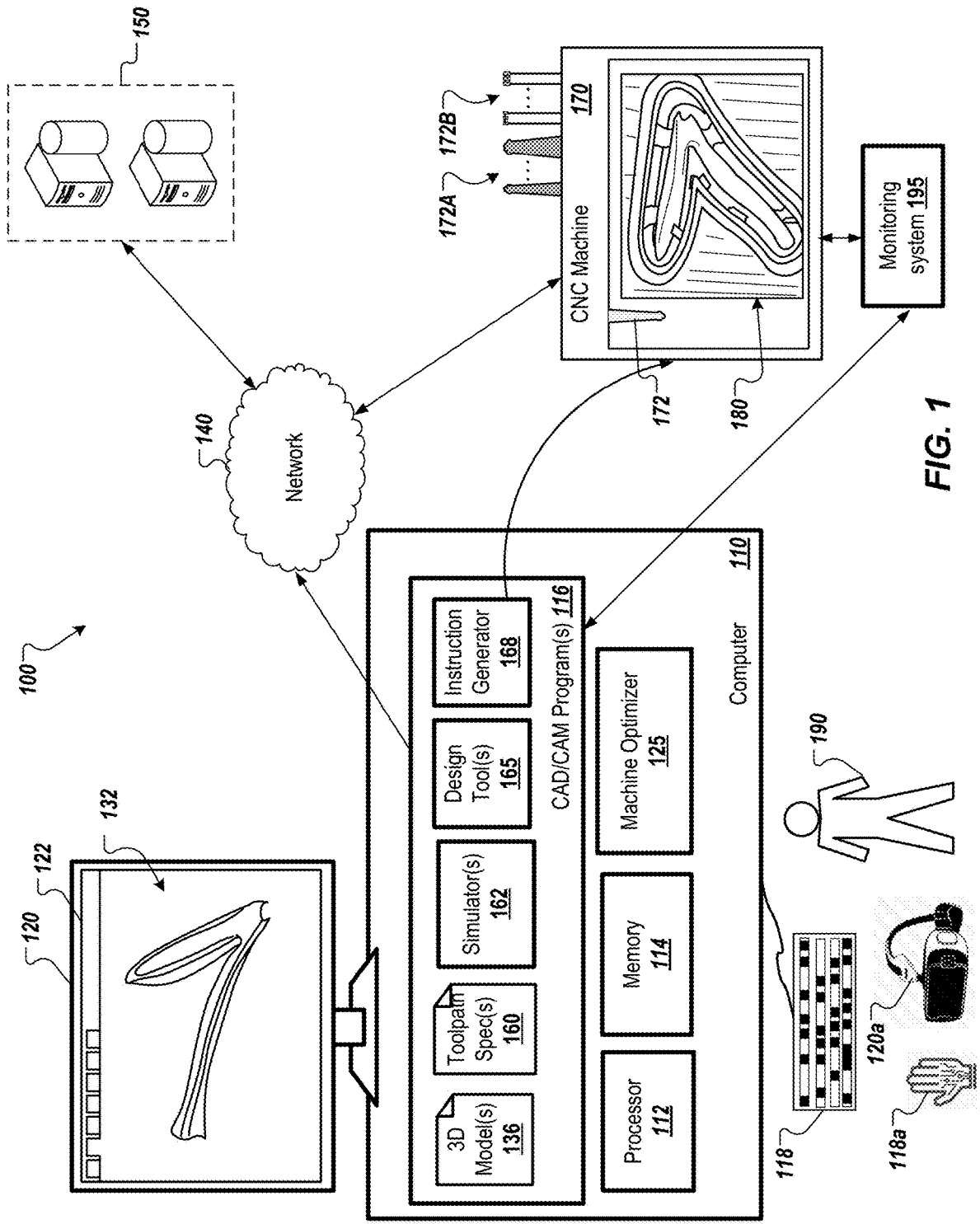
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more three-dimensional (3D) modeling, simulation (finite element analysis or other) and manufacturing control programs such as Computer Aided Design (CAD) and/or Computer Aided Manufacturing (CAM) program(s) 116, also referred to as Computer Aided Engineering (CAE) programs, etc. A user 190 can interact with the program(s) 116 to create and/or load 3D models 132 of parts to be manufactured using a Computer Numerical Control (CNC) manufacturing machine 170, such as a multi-axis, multi-tool milling machine. The program(s) 116 can run locally on computer 110, remotely on a computer of one or more remote computer systems 150, (e.g., one or more third party providers' one or more server systems accessible by the computer 110 via the network 140) or both, locally and remotely. The CAD/CAM Program (s) 116 may be computer programs having implemented logic for designing 3D models for parts to be machined from a workpiece. Based on such defined 3D models and evaluation of positioning, movements, and wear characteristics of machine components of the CNC machine, a position for machining in relation to machine components can be defined. Such a position may be determined based on machine optimization logic that outputs a position for the machining to even out wear on components used for the machining. Such machine optimization logic may be implemented as part of the CAD/CAM program(s) 116, or as an external component communicatively coupled with the CAD/CAM program(s) 116.

The CAD/CAM program 116 presents a user interface (UI) 122 on a display device 120 of the computer 110, which can be operated using one or more input devices 118 of the computer 110, (e.g., keyboard and mouse). Note that while shown as separate devices in FIG. 1, the display device 120 and/or input devices 118 can also be integrated with each other and/or with the computer 110, such as in a tablet computer or in a virtual reality (VR) or augmented reality (AR) system. For example, the input/output devices 118, 120 can include a VR input glove 118a and a VR headset 120a.

The CAD/CAM program(s) 116 may be associated with creating 3D models 136 (e.g., 3D model 132) for CNC manufacturing machines through utilization of design tools 165 provided to the user 190. This can be done using known graphical user interface tools, and the 3D models 136 can be defined in the computer using various known 3D modeling formats, such as solid models (e.g., voxels) or surface models (e.g., B-Rep (Boundary Representation (B-Rep)) and surface meshes). In addition, the user 190 can interact with the program(s) 116 to modify the 3D model 132 of the part, as needed.

In some instances, a CNC machine, such as the CNC machine 170, can include powerful and highly accurate computer-controlled tools that perform repeated and precise movements to machine parts out of workpieces positioned on a machining bed of the CNC machine. The CNC machine 170 can receive computer-generated code and convert it into electronic signals based on implemented logic at the CNC machine thus to reproduce movements by some machine components based on the received instructions. Instructions received at the CNC machine in relation to machining a part may be defined in terms of defining machine tool motions, working bed (table) motions, or both.

In the example shown, the model 132 is a 3D model of a particular part, for example, a connector for attachment of manufactured parts into a larger system or machine. In some examples, the model 132 can be a 3D model of other parts such as a circuit board, a tool part, jewelry, among others. Many different types of models can be used with the systems and techniques described herein. Once the 3D model 132 of the part is ready to manufacture, the 3D model 132 can be prepared for manufacturing the physical structure of the part by generating toolpaths for use by the computer-controlled manufacturing system. For example, the 3D model 132 can be used to generate a toolpath specification document 160, which can be sent to the CNC machine 170 and used to control operation of one or more milling tools. The CAD/CAM program(s) 116 include an instruction generator 168 that generates instructions in relation to machining a part to the CNC machine 170 based on a toolpath specification, such as the toolpath specification 160. In some instances, the instruction generator 168 may also generate instructions including one or more positions for machining the part that can be defined to even out wear of machine components at the CNC machine 170. Such instructions generated at the instruction generator 168 can be based on the generated toolpath specification 160 and also can include instructions in relation to a position for machining the part that is based on implemented optimization logic, where the position evens out wear of the components during the machining. The instruction generator 168 can communicate the generated instructions to the CNC machine 170.

In some instances, instructions for machining a part and providing instructions for optimized positioning, can be generated based on an input provided by the user 190, or in light of the user's request for another action, such as sending the 3D model 132 to the CNC machine 170, or other manufacturing machinery, which can be directly connected to the computer 110, or connected via a network 140, as shown. This can involve a post-process carried out on the local computer 110, or a cloud service, to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. The document may also include data for positioning for the machining, including an initial position for the workpiece, and other positions during the machining, for example, in relation to different setups defined for machining the part.

In some instances, when a part is machined, different setups for the machining may be defined with the toolpath specification 160. Based on the toolpath specification information associated with a setup, machining tools are instructed to move in relation to the positioning of the block, and the block's location and orientations within the CNC machine 170. When more setups are arranged for machining a single part, more programming time and more programming resources are to be provided for defining the toolpaths corresponding to such setups, and thus machining is associated with higher costs. When optimization logic is implemented and used to determine positioning for machining of a part to reduce wear on some machine components and thus to even out wear, multiple positions may be defined in relation to the configured different setups.

Further, in some implementations, the computer 110 is integrated into the CNC machine 170, and so the document 160 is created by the same computer that will use the document 160 to manufacture the part 180. In some implementations, a toolpath specification document 160 can be generated that includes one or more roughing toolpaths that cause the CNC machine 170 to use one or more cutting tools 172 to perform rouging operation(s) to cut a roughed structure from a workpiece to form the part on which further operations, such as semi-finishing operation(s) and finishing operations, can be performed. When a part is machined from the workpiece, different forces with different magnitude and direction are applied. As will be appreciated, there are many different types of cutting tools 172 that may be available in the CNC machine 170 for machining a part out of a workpiece. The cutting tools can include milling cutter tools with various ball nose, tapered, tip radius and barrel geometries. By using these tools during machining, different forces are applied to machine the part. The different cutting tools 172 that can be used for machining a part can include solid tools having different diameters and tip radius (e.g., solid carbide round tools) that create different cutting surface geometries for the tools 172, and/or insert tools having different diameters and metal (e.g., carbide) inserts that create different cutting surface geometries for the tools 172. These different tools 172 can be arranged in tool families, where a tool family has one or more shared tool characteristic (e.g., a family 172A of solid carbide round tools having different diameters and tip radius that create the different cutting surface geometries, and a family 172B of insert tools having different diameters and metal inserts that create different cutting surface geometries). In addition, the CNC machine 170 can include other components and systems, such as rotatable platforms/attachments (e.g., for five-axis milling processes) and cleaning systems (e.g., sprayed water cleaning systems).

In some instances, when a toolpath specification is defined in a computer-aided design program for a part to be machined, such as the CAD/CAM program(s) 116, the toolpath specification is provided to the CNC machine 170 to instruct machining of the part. In some instances, during the manufacturing process of a part, different forces are applied at different locations on the part. The cutting forces may be different at different stages of the manufacturing process. Different types of machining operations may be associated with different forces applied and having different directions. Further, when a part is machined, the operations may be performed at different sides of the part. For example, once machining processes are performed on a first side of the part, the workpiece may be flipped over and further machining processes can be performed on the other side. Such machining processes may be roughing operations, final cutting operations, etc. The different machining processes may be associated with different cutting forces applied with different directions, and/or applied at a different angle toward the surface of the part. Therefore, wear of machine components may be determined according to predicted cutting forces, their magnitude, and directions in relation to machining a part according to a received toolpath specification, such as the toolpath specification document 160 (e.g., a numerical control (NC) program of an appropriate format). The toolpath specification can include different toolpaths associated with different stages for machining a part from a workpiece.

During machining of parts at the CNC machine 170, the CNC machine 170 and included tools and defined machining envelope are utilized to perform movements and operations according to the information provided by the instructed toolpath specification 160. When a part is machined, different machine component wear at different levels and at different locations or portions of the part, thus the wear of components at the CNC machine 170, may not be even and/or balanced so as to prolong the life of the machine components and/or the whole CNC machine 170. A machine optimizer 125 is implemented to provide logic for determining positions for machining parts based on generated toolpaths specification 160 at the CAD/CAM programs 160 to provide such instructions for positioning together with the toolpath specification to the CNC machine 170 to even out wear of machine components of the CNC machine 170. The machine optimizer 125 can implement logic to determine a position for the machining of the part with respect to at least one of the set of machine components. The position is determined to even out wear on the set of machine components. The determination of the position is based on data indicating previous positions, movements and wear of components associated with the computer-controlled manufacturing system.

In some instances, at least a portion of the data indicating the previous positions, movements and wear of components can be generated. For example, data for the previous positions and movements and wear characteristics for machine components of the CNC machine 170 may be generated at the CNC machine 170 and/or collected and stored at a monitoring system 195 communicatively coupled to the other CNC machines of the same type. In some instances, a position for the machining is determined by providing the information regarding the geometry of the part and an identification of the set of machine components to a machine learning program. Based on such input, the machine learning program can output the position for the machining of the part. The machine learning program can be trained based on the data indicating the previous positions, the movements and the wear of components associated with the computer-controlled manufacturing system. In some instances, the data for wear of components may include data indicating wear characteristics for the components as received from a monitoring system where wear is measured, for example, by performance testing. Further, the data for wear of components may include data generated through simulation techniques, for example, based on performing finite element analysis (FEA) simulation. Based on the machine learning logic, the positon for the machining of the part with respect to at least one of the set of machine components is received. Such a position evens out wearing of the set of machine components.

In some instances, CAD/CAM program(s) 116 can include simulator(s) 162 implementing algorithms that can be used to simulate machining the part from the workpiece using one or more tools, and determine the tooling forces that will be applied to the workpiece during a particular machining operation, and determine simulated wear of machine components during machining operations, and identify factors associated with faster wearing of machine components. It can be appreciated, that the simulator(s) 162 can be implemented and executed outside of the CAD/CAM program(s) 116 as module(s) communicatively coupled to the CAD/CAM program(s) 116. In some instances, the simulator(s) can be implemented as part of the machine optimizer 125, or may be executed on a different computer than the computer 110 and communicate with the CAD/CAM program(s) 116 and/or the machine optimizer 125 over the network 140. The simulation process can be parallelized (e.g., multiple programs 162) and/or be performed either on the local computer (e.g., computer 110 or CNC machine 170) or on remote computer(s) (e.g., one or more remote computer systems 150).

Figure 2A:
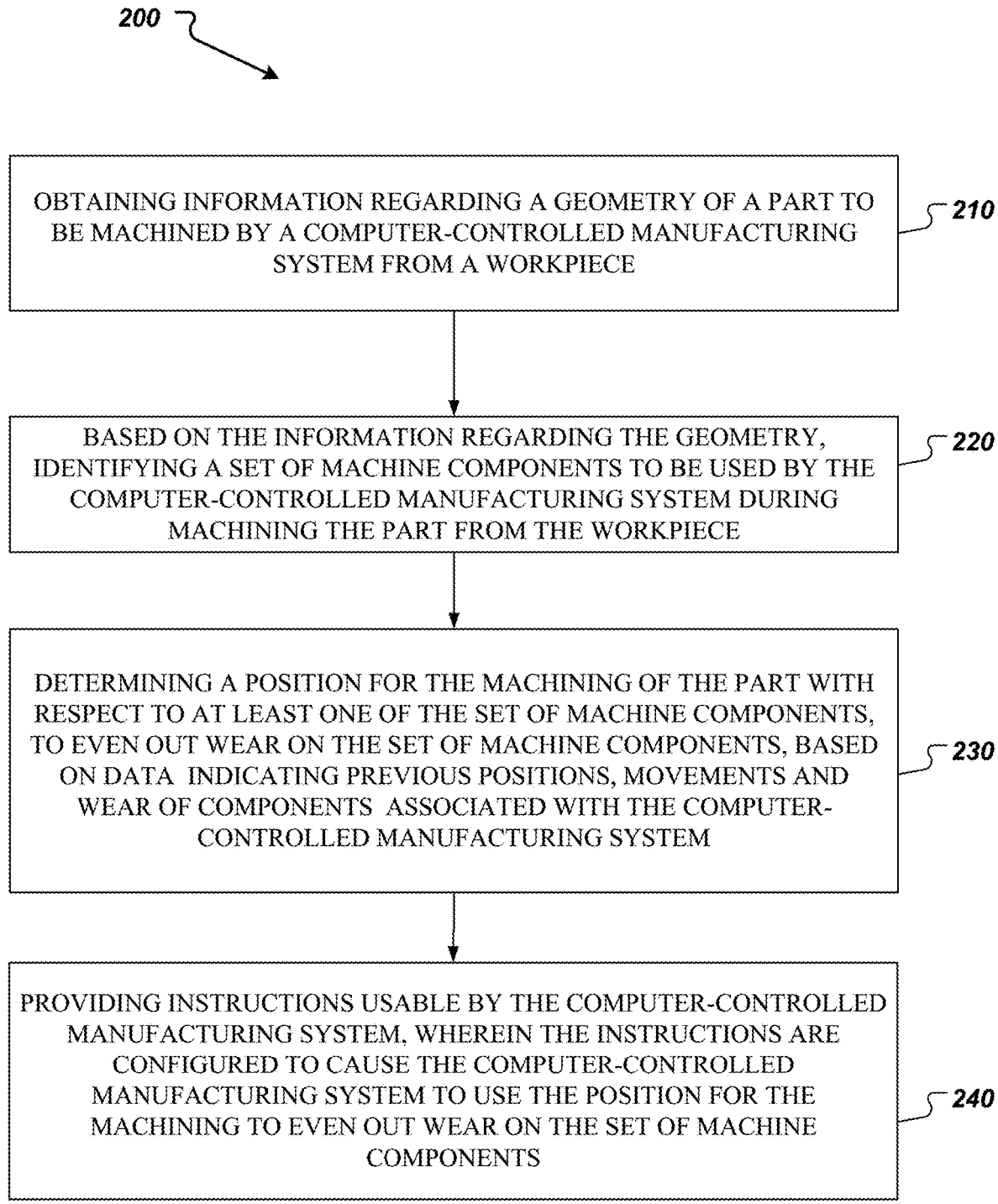
FIG. 2A shows an example of a process to determine a position for machining a part to even out wear on machine components associated with a computer-controlled manufacturing system.

FIG. 2A shows an example of a process 200 to determine a position for machining a part to even out wear on machine components associated with a computer-controlled manufacturing system. For example, the process 200 may be implemented as part of a computer-aided design or manufacturing program running in relation to a computer-controlled manufacturing system for machining parts from workpieces of different material and shape. In yet another example, the process 200 may also be executed outside of a CAD/CAM program, at a separate program including implemented logic to process generated toolpath specification and determine positions for machining parts. The process output may be fed into such a CAD/CAM program or directly provided to a computer-controlled manufacturing system for machining parts from workpieces, such as the CNC machine 170 of FIG. 1.

At 210, information regarding a geometry of a part to be machined by a computer-controlled manufacturing system from a workpiece is obtained. In some instances, the information can be a received 3D model of the part to be machined. Based on the 3D model of the part, a toolpath specification for machining the part can be generated, for example, based on logic for toolpath generation, such as the logic implemented at the CAD/CAM program(s) 116 of FIG. 1. In some instances, the information can be a received toolpath specification for the geometry of the part, for example, provided by a CAD/CAM program in relation to a request to generate a specification for machining a part of a certain geometry. In some instances, the provided toolpath specification may be usable by the computer-controlled manufacturing system to machine at least a portion of the geometry of the part from the workpiece.

At 220, based on the information regarding the geometry, a set of machine components are identified as to be used by the computer-controlled manufacturing system during machining the part from the workpiece. In some instances, a CNC machine includes moving machine components that are associated with general or localized wear depending on the usage of the machine. For example, such moving machine components are ball screws, ball screw nuts, ball screw bearings, guiding system rails, linear rails, guiding system bearings, measuring system reader head bearings, etc. If a CNC machine performs the same task in the same place on a repetitive basis, then the wear can be localized to the distances travelled when the machine components is moving. In some instances, relationships between components associated with the machining may be pre-defined. For example, when a ball screw is identified as a machine component to be used for the machining, a ball screw nut may be automatically identified as a component that is also to be used for the machining. In some instances, machine components may be identified iteratively and based on evaluation of predefined relationships between some or all of the machine components of the computer-controlled manufacturing system. It can be appreciated that tuples of different size can be defined to identify related machine components, where by identifying one machine component, the rest of the machine components from the corresponding tuple may be automatically added to the set of machine components thus to improve resource expenditures. In some instances, a location within a CNC machine may be identified as to be associated with providing certain level of accuracy of performing a machining operation. Accuracy of performing a machine operation may be related to kinematics of the CNC machine and machine components arrangements and set up. For example, a location within the CNC machine may be identified as an area including a portion of at least one machine component directly associated with performing a machining operation, such as a cutting operation. In some cases, the location can be an intersection or a connecting spot between a set of machine components that are engaged in performing a machining operation and experience induced forces of the performed machining operation. When a part is to be machined, an identified location associated with expected accuracy can be used to define positioning of the workpiece to machine the part. For example, distribution of workload on machine components can be distributed based on machining requirements, such as those associated with accuracy.

In some instances, accuracy for machining a part may be associated with specifics of a geometry of the part and/or may be related to the type of machining operation or phase of machining the part. For example, roughing operations may be associated with lower levels of required accuracy compared to finishing operations that are related to higher level of accuracy. Further, a machining operation may be associated with a requirement for higher accuracy of execution with respect to a defined toolpath specification. The machining operation can be defined as part of a series of machining operations that inherently affect the subsequent load of the CNC machine. For example, a machining operation performed with a lower accuracy may be associated with performing a subsequent operation requiring more resources, time, and inducing forces at machine components (or portions thereof) that may lead to increased wearing of the machine components, globally or at a particular location or portion of the machine components.

At 230, a position for the machining of the part with respect to at least one of the set of machine components is determined. The position is determined to even out wear on the set of machine components. The determination of the position is based on data indicating previous positions, movements and wear of components associated with the computer-controlled manufacturing system.

In some instances, the position can be determined based on the geometry of the part and tool axis orientations at the computer-controlled manufacturing system, where the geometry of the part may be associated with a set of positions for machining the part that are possible with respect to the geometry and the tool axis orientations.

In some instances, an identification of a position for machining a part within a CNC machine may be performed in relation to different machining operations associated with machining the part. The different machining operations can be associated with different accuracy requirements. The identification of the position for the machining may be performed based on an analysis over historical data collected from executions at the CNC machine that can be related to accuracy of machining with respect to different positions and wear of machine components when performing different operations at different positions. Some machining operations may be associated with requirements for a higher precision compared to other machining operations associated with lower precision. In some instances, a machining operation can be performed to machine a part where accuracy is critical for the execution of the machining operation. In such case, to provide the accuracy for machining such a part, one or more positions for machining the part within the CNC machine that are associated with the required accuracy may be identified and evaluated. Thus, if multiple positions for machining a part with respect to machine components can be defined as available, such multiple positions may be filtered out to select a subset of positions (or even only one position) that may provide accuracy of machining that corresponds to an accuracy criterion for machining the part. In such case, from the subset of positions, one or more positions may be identified to even out wear on the machine components of the CNC machine. By identifying a position that corresponds to an accuracy criterion and evens out wear on machine components, machining of parts can be improved while also extending the life of the components in the CNC machine by taking account of loads within the CNC machine. Cutting forces can be distributed evenly between locations in the CNC machine to provide high quality results while at least a portion of a machine component experiences induced forces in an even manner to provide decrease in wear of machine components and result in even wear of the CNC machine.

In some instances, at least a portion of the data indicating the previous positions, movements and wear of components can be generated. For example, data for the previous positions and movements and wear characteristics for machine components of a computer-controlled manufacturing system can be generated at a software component on the manufacturing system and/or collected and stored at a monitoring system (such as the monitoring system 195 of FIG. 1) communicatively coupled to the computer-controlled manufacturing system. When a computer-controlled manufacturing system performs instructions in relation to machining parts out of workpieces based on a received toolpath specification, the system can store log data for the execution of the operation, where such log data may include metadata about the time of execution, positioning of the components, executed movements, configurations on the machine when the machining is performed, among other items.

In some instances, the generation of the data indicative of previous positions, movements, and/or wear of components can include tracking positions and movements of components associated with the computer-controlled manufacturing system and collecting wear data for the components associated with the computer-controlled manufacturing system. The tracking of positions and movements of components of a manufacturing machine can be configured, and the manufacturing system may be provided with sensors to capture positioning and movements. Further, sensors may be provided in the manufacturing system to capture actual cutting forces experiences by the workpiece in relation to particular positioning and movements of one or more machine components. Such collected data from sensors with regard to positioning, movement and experienced cutting forces, may be used when performing calculations in relation to simulated component wear.

In some instances, when cutting forces are simulated and calculated, the measurements can take into account material characteristics of a block of material used for machining the part. When wear of components is simulated, such data for material characteristics may be used to predict wearing of a machine component or a CNC machine as a whole.

Additionally, to collect data for wear of machine components, a performance check can be performed for a component where based on performance measurements a level of wear of a machine component can be identified. For example, a unified system for classifying wear of components can be defined that includes a scale for wear. Such a system can be relevant for general computer-controlled manufacturing systems, or for certain types of systems, such as milling machines. Tests can be performed in relation to executing test operations, such as a predefined cut operation performed by a tool, such as a ball screw, where based on timing for execution of the tasks, a certain wear level on the wear scale can be identified. Scales and level of wear can be a configurable property for storing metadata at a system (for example, the computer-controlled manufacturing system, or a monitoring system, or another suitable system). For example, data related to wear properties of machine components can be tracked and stored at a monitoring system communicatively coupled to the computer-controlled manufacturing system, or may be generated and stored at an integrated computer program at the computer-controlled manufacturing system.

In some instances, a portion of collected data from tracking positioning and movements of machine components and wear characteristics of the machine components can be provided for determining a position for execution of a next machining operation in relation to a requested part. In some instances, such data can be used to train a machine learning algorithm to determine as an output a position for a next machining operation based on pre-trained machine learning rules. The machine learning algorithm may be trained with historic data for positions, movements and wear of components of the computer-controlled manufacturing system. Further, simulation data for wear of components based on the information for the geometry of the part to be machined may be also used for the machine learning training.

In some instances, simulation data may be generated by a simulator implementing computer simulation including selecting an initial stock amount for machining the part with the 3D model out of the workpiece based on the toolpath specification generated for the 3D model; performing a numerical toolpath simulation using a finite element analysis (FEA) procedure to simulate the machining of the part; assessing the wear of machine components utilized for machining the part in accordance with the finite element analysis of the numerical toolpath simulation based on evaluating the predicted cutting forces and cutting force directions applied by the machine components during the simulation; incrementally adjusting positioning and movements of the machining, based on the assessed wear, to indicate a next position for machining the part in relation to at least one of the machine components; and repeating the performing the numerical toolpath simulation, the assessing the wear, and the incrementally adjusting the position to optimize the machining by evening out the wear of the machine components associated with the machining. The simulation method can include receiving input specifying a machining preference among manufacturing speed, surface finish quality, maximizing tool life, and minimizing vibration, among others. The simulation can be in accordance with the machining preference.

In some instances, the results from the simulations can be input to a neural network to train a machine learning algorithm and to generate machine learning rules defining associations between positions of workpieces when machining in relation to a component(s) of the manufacturing system, wear characteristics of the components, and induced forces reflected by the components.

In some other instances, training data can be generated based on collected data from executed machine processed that are performed based on planned executions at a CAM software, where machining processes are planned for execution based on defined tool paths for performing machining. The executed machining processes can span over a period of time that can provide a volume of historic data that can be used for further evaluation and/or training of a neural network to determine positions for execution of further machining that even out wear on at least some of the machine components. The collected training data may include data associated with movement and forces applies by a machining tool within a machining envelope associated with a machining processes. The collected data can be data collected based on repeated machining of parts (same instances of the same part or different parts) by one or more (similar of different) instances of a machine. The parts can be machined from a substantially similar workpiece and based on a substantially similar positioning setup within the working envelope. In some instances, the training data may include multiple data points associated with machining of substantially same parts with the same setup by one or more instances of a machine having substantially the same machine components.

In some instances, collected data based on executed machining processes can be evaluated and processed to define a pair data set based on a grid of points defined on a surface associated with at least one of the components related to the machining. In some instances, the grid can be a uniform grid of sample points that can be created over a portion or the entire surface (or volume) of the machining envelope (e.g., the area accessible by the tool head). The machining envelope can be an area for positioning a workpiece to machine a part by using a machining tool. The portion of the surface (or volume) of the machining envelope can be a surface (e.g., part of a volume) associated with one or more of the machine components. The pair set data can be point data that defines for each of the points on the grid i) a number of times that a machining tool has passed (or crossed over) each point of the grid while machining one or more parts (e.g., similar, identical, or distinct parts machined from workpieces), and ii) a velocity vector amount per point (e.g., average velocity determined based on the number of passes of the machining tool over a specific point of the grid).

In some instances, machine components can be evaluated to determine initial wear of the components. Wear characteristics can be measured at specific points on the surface associated with the components. In some instances, the wear characteristics can be measured at the points of the grid defined for the surface associated with at least one of the components related to the machining that was defined for collecting the pair set data as discussed above.

Based on 1) the calculated data—defining the number of times that a machining tool had passed over a point and the velocity vector amount for each point, 2) the measured wear level of machine components, and 3) information (e.g., geometry of the part, toolpath specification, etc.) about a new machining process requested for machining a part, a prediction for an increase in wear over the points on the defined surface associated with the at least one of the machine components can be provided. Such prediction can be associated with the different points defined on the grid and can be used to determine a position for machining the part with respect to the at least one of the machine components to even out wear on the machine components.

In some instances, training data collected from repeated machining of one or more parts by one or more instances of a machine (e.g., different instances of the machine including at least the same subset of machine components related to machining the parts) can be used to determine correlation between a given velocity vector amount for a point on the grid of points on the surface associated with the at least one machine component and an increase in wear at the respective points. For example, the determination of such correlation can be performed based on a data exploration analysis, such as a Principal Components Analysis (PCA). By performing a data exploration analysis, a prediction as to the expected wear of machine components can be provided. Such a prediction can be used when determining a position to machine a part to even out wear on at least some of the machine components.

In some other instances, the collected training data can be used to train a neural network and to generate a machine learning model to predict increase in wear of machine components at points on at least a part of the surface associated with the components. The generated pair set data being used as the training data, together with information for the current state of wear of machine components of a given machine, and information for a machining to be executed that defines a toolpath for use for the machining of a part, can be fed into the machine learning model to predict the increase in wear at points on the surface associated with at least one of the machine components. In some cases, different points on the surface can have different predicted increases in wear. In some instances, by moving a part during machining, the toolpath may pass through different points on the grid that may be associated with different velocities, which in turn can reflect on a change in the predicted wear over the surface. Based on the predictions for the wear at different points on the surface, an appropriate algorithm can be used to incrementally move a part to determine a position that is associated with minimized wear.

In some instances, a position for the machining is determined by providing the information regarding the geometry of the part and an identification of the set of machine components to a machine learning program. Based on such input, the machine learning program can output the position for the machining of the part. The machine learning program can be trained based on the data indicating the previous positions, the movements and the wear of components associated with the computer-controlled manufacturing system. In some instances, the data for wear of components can include data indicating wear characteristics for the components as received from a monitoring system where wear is measured, for example, by performance testing. Further, the data for wear of components can include data generated through simulation techniques, for example, based on performing an FEA analysis. Based on the machine learning logic, the positon for the machining of the part with respect to at least one of the set of machine components is received. Such a position can even out wearing of the set of machine components.

In some instances, the position for the machining can be determined based on machine learning logic implemented at a machine learning program. There may be different machine learning algorithms used alone or in combination when determining the position. For example, the machine learning program can include an online reinforcement learning program. The online reinforcement learning program can be used to train the neural network in an initial phase of training without the need to use labeled input-output pairs to approximate a function of wear of machine components of a computer-controlled manufacturing system of a certain type. Such a learning program can interact with training data received as input and including observations in relation to executed operations, sequence of operations, performance metrics, movements, data for positioning of components and the workpiece within the machining envelope, among others.

In some instances, the training of a machine learning algorithm at a learning program may be performed in stages, where an initial training may be performed according to online reinformance learning techniques. Further, once data is collected and initial patterns in the observed data are identified, target data for the training can be identified that may extend the amount and attributes of the data used for the initial training, and further training may be performed using the same learning techniques or different. Iterative training may be performed up until a level of accuracy of the predictions corresponds to the actual wear on components when predictions are used for instructions on the manufacturing system.

In some instances, for a subsequent training iteration, a supervised learning may be used to estimate a function that maps an input, such as the information for the geometry of a part to be machined and relevant machine components for the machining, to an output, such as a position for machining the part. The supervised learning technique can use input-output data pairs that can be generated, for example, at least in part from the previous learning phase, and based on continuously collected historic data for performed operations at a manufacturing system. It can be appreciated that historic data can be collected from a machine targeted for the execution of the instructions for machining the part, or can be collected from multiple manufacturing machines having the same machine type that are used for machining part. Historic data can be collected through monitoring systems associated with the manufacturing systems or through a centralized monitoring system as a hub for multiple systems. Collecting, managing, and evaluating historic data can be performed at computer implemented software that can be provided as a cloud service or an on-premise application.

In some instances, when simulation is performed to determine wear on components based on a provided 3D model of a part or a toolpath specification, wear on components can be predicted. Further, simulation of wear of machine components can be used in relation to a training of a machine learning algorithm to estimate or predict wear on components based on simulated wear of components based on information for the part, as received at 210, and based on tracked historic data from a computer-controlled manufacturing system for positioning, movement and wear of machine components. Thus, based on the training, machine learning rules can be generated based on the historic data and the simulation data to predict wear of components based on an input information for a geometry of a part to be machined.

In some instances, based on training of a machine learning algorithm with input data, such as historic data for performed operations by machine components and/or wear data for the machine components and/or expected wear on components based on an executed simulation analysis (FEA or other), patterns in the data can be identified and factors that affect the wear of components can be predicted. Thus, by identifying such patterns and factors, a position for machining a part in relation to at least one machine component of the computer-controlled manufacturing system can be determined.

In some instances, different techniques and analysis may be used alone or in combination for determining a position for machining a part. The use of different learning methods and analysis can be iteratively performed and evaluated to identify a next learning phase. Such learning may be dynamically adjustable based on user-provided configurations in relation to requirements and data for the analysis.

At 240, instructions usable by the computer-controlled manufacturing system are provided. The instructions are configured to cause the computer-controlled manufacturing system to use the position for the machining to even out wear on the set of machine components. The instructions can include a toolpath specification for machining the part that defines positioning of the workpiece during machining so as to even out wear on the set of machine components.

Figure 2B:
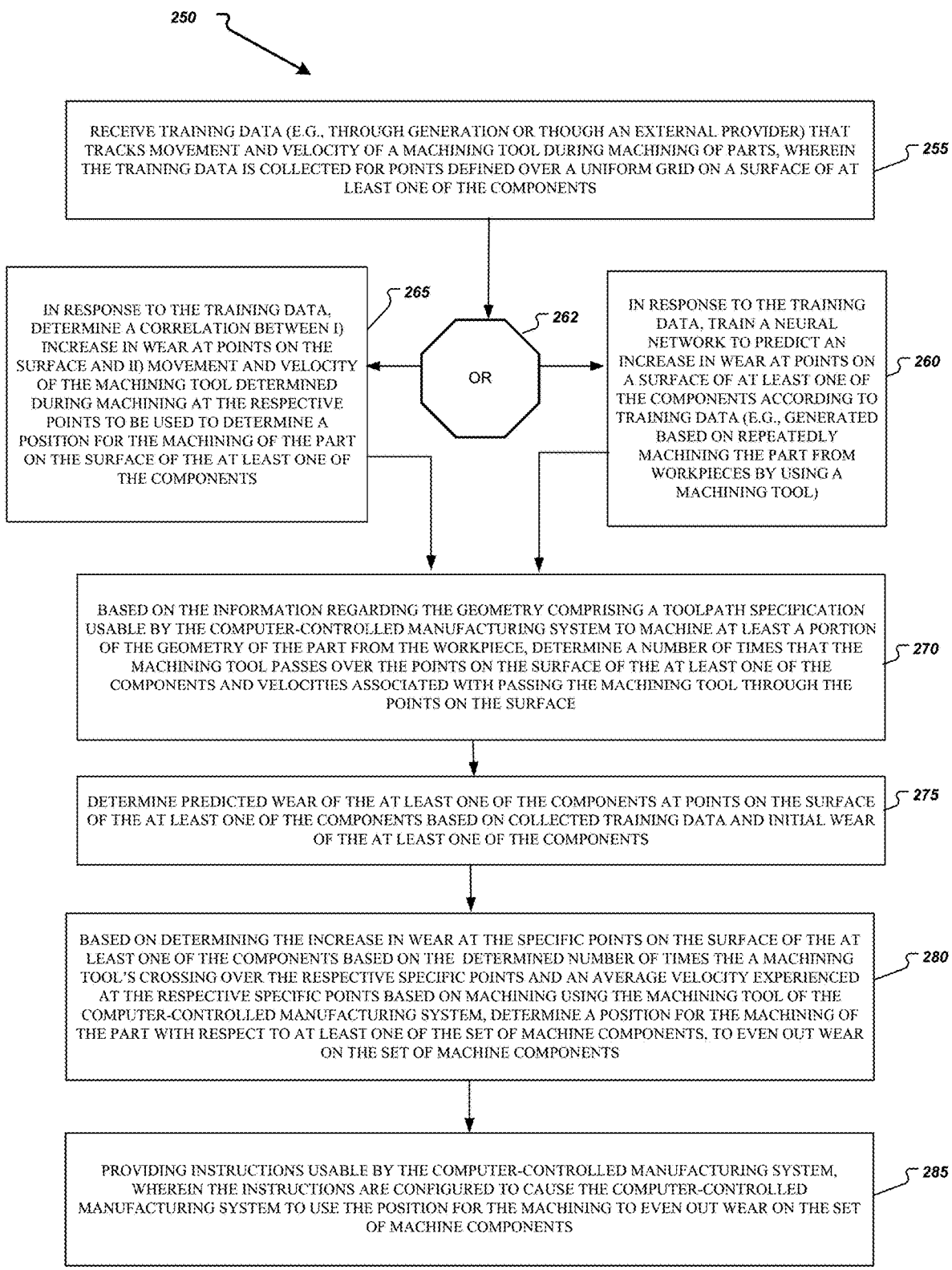
FIG. 2B shown an example of a process to determine a position for machining a part to even out wear on machine components according to a determined predicted wear of at least some of the components based on training data.

FIG. 2B shown an example of a process 250 to determine a position for machining a part to even out wear on machine components according to a determined predicted wear of at least some of the components based on training data. For example, the process 250 can be implemented as part of a computer-aided design or manufacturing program running in relation to a computer-controlled manufacturing system for machining parts from workpieces of different material and shape. In yet another example, the process 250 may also be executed outside of a CAD/CAM program, at a separate program including implemented logic to process generated toolpath specification and determine positions for machining parts. The process output may be fed into such a CAD/CAM program or directly provided to a computer-controlled manufacturing system for machining parts from workpieces, such as the CNC machine 170 of FIG. 1.

At 255, training data is received. The training data can track movement and velocity of a machining tool during machining of parts, wherein the training data is collected for points defined over a grid (e.g., uniform grid) on a surface associated with at least one of the components. In some cases, the training data can be generated at a machine, for example, by a CAD/CAM software. The training data can be also received from an external provider as input provided by another process or system execution and in relation to machining a part, which can include real machining executions and/or simulations thereof.

At 262, based on the received training data, the method 255 can be configured to either process to block 265 or to block 260. The configuration of the process can be based on a preferred implementation to determine an increase in wear of machine components at points on the surface to support a determination for positioning a new part to be machined to even out wear on at least some of the machine components. However, in some implementations, no decision 262 is made since a given implementation can perform either block 260 or block 265 in accordance with the implementation's original design.

At 265, in response to the training data, a correlation between i) an increase in wear at the points on the surface (i.e., defined on a grid that can be a uniform grid) and ii) movement and velocity of a machining tool can be determined. The movement and velocity of the machining tool can be determined during machining at the respective points of the grid. The determined correlation can be used to determine a position for the machining of the part on the surface associated with the at least one of the components.

At 260, in response to the training data, a neural network is trained to predict an increase in wear at points on a surface associated with at least one of the components according to training data (e.g., generated based on repeatedly machining the part from workpieces by using a machining tool).

At 270, based on the information regarding a geometry of a part to be machined (e.g., the information can include a toolpath specification usable by the computer-controlled manufacturing system to machine at least a portion of the geometry of the part from the workpiece), a number of times that the machining tool passes over the points on the surface associated with the at least one of the components and velocities (or velocity vector amounts, such as average velocity vectors) associated with passing the machining tool through the points on the surface can be determined.

At 275, predicted wear of the at least one of the components at points on the surface associated with the at least one of the components is determined. The determination of the predicted wear is based on the collected training data and an initial wear (or a state of wearing) of the at least one of the components.

At 280, based on determining the increase in wear at the specific points on the surface associated with the at least one of the components based on i) the determined number of times the a machining tool's crossing over the respective specific points and ii) an average velocity experienced at the respective specific points based on machining using the machining tool of the computer-controlled manufacturing system, a position for the machining of the part with respect to at least one of the set of machine components is determined to even out wear on the set of machine components.

At 285, instructions usable by the computer-controlled manufacturing system are provided. The instructions are configured to cause the computer-controlled manufacturing system to use the position for the machining to even out wear on the set of machine components.

Figure 3A:
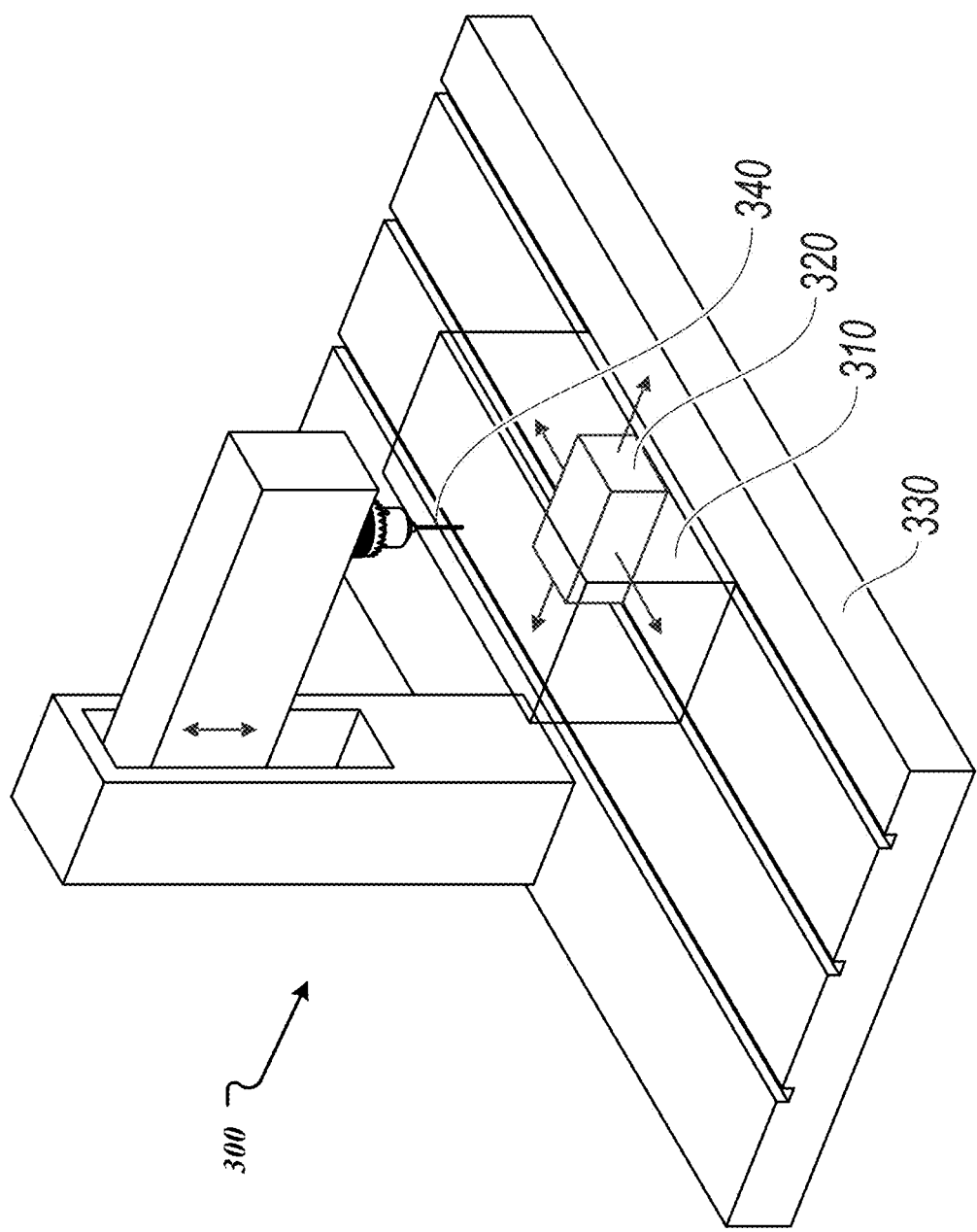
FIG. 3A shows an example of a machining envelope as part of a Computer Numerical Control (CNC) machine used for machining a part out of a workpiece.

FIG. 3A shows an example of a machining envelope 310 as part of a CNC machine 300 used for machining a part out of a workpiece. In some instances, the CNC machine 300 may be such as to the CNC machine 170 of FIG. 1 In some instances, the CNC machine may be such as the computer-controlled manufacturing system as discussed in relation to FIG. 2A or FIG. 2B. The CNC machine 300 may receive the instructions provided from an execution of method 200 of FIG. 2A or method 250 of FIG. 2B, to even out the wear of the machine components of the CNC machine 300.

CNC machines may be broadly classified by a number of axis involved in moving when machining parts from workpieces. The CNC machine 300 is an example of a 3-axis tool. However, it should be appreciated that other CNC machines, such as 4-axis, 5-axis, among others (e.g., a 2.5-axis machine) may also have corresponding features to the CNC machine 300, and thus received instructions from a CAD/CAM software as discussed in relation to FIG. 1, and receive instructions for positioning a workpiece in relation to at least one of the machine components, such as the instructions generated at method 200 of FIG. 2A or method 250 of FIG. 2B. When the CNC machine 300 is turned on, a machine operator may initiate a definition of a home position so that the CNC machine 300 knows where the axes for moving machine components, such as cutting tools performing the cutting operations over a workpiece, are positioned in a work space (e.g., machining envelope) at the table. Once a home position is defined, the CNC machine 300 defines machining coordinates in relation to such a home position. The CNC machine 300 is a 3-axis machine defining a three-coordinate system, having an x-axis and a y-axis are defined on the layer of a working bed (or table) 330, and a z-axis is defined for the movement of tools initiating contact with a workpiece when positioned on the working bed 330 from above and moving in an up-ward and down-ward motion towards the workpiece to perform operations, such as cutting operations.

In some instances, a workpiece is positioned on the working bed 330 of the CNC machine 300 in relation to the home position to execute received instructions for performing tool motions and applying forces (such as cutting forces applied during a milling process) to machine the part. In some instances, the definition of the home position may be provided as an instruction for positioning the workpiece 320 to machine the part so as to even out wear on components of the CNC machine 300. The definition of the home position in the machining envelope can be generated based on a provided position for the machining in relation to one or more of the machine components of the CNC machine 300.

At the example of FIG. 3A, the workpiece 320 is positioned at a particular position in relation to the working bed 330. The workpiece 320 can be fixtured at a position within the machining envelope 310 of the CNC machine 300 so as to increase usage of the machining envelope 310 and decrease uneven wear of the working bed 330 included in the set of machine components. The machining envelope 310 is defined on the working bed 330, where multiple linear rails are defined as part of a guiding system to allow positioning of a workpiece holder (e.g., a machine vise) to fix the position of the workpiece for machining the part. The workpiece 320 can be positioned in relation to a cutting tool 340 that is moving on the z-axis defined for the machining envelope 310 to perform cutting operations in relation to the workpiece 320 to machine the part.

In some instances, when the CNC machine 300 is started based on user input to execute machining of a part of a certain geometry, the CNC machine 300 can receive instructions for a position for machining in relation to at least one of the machine components of the CNC machine 300 to even out wear of the machine components. Based on the received instructions, the CNC machine 300 can define a home position for the machining on the working table 330.

Figure 3B:
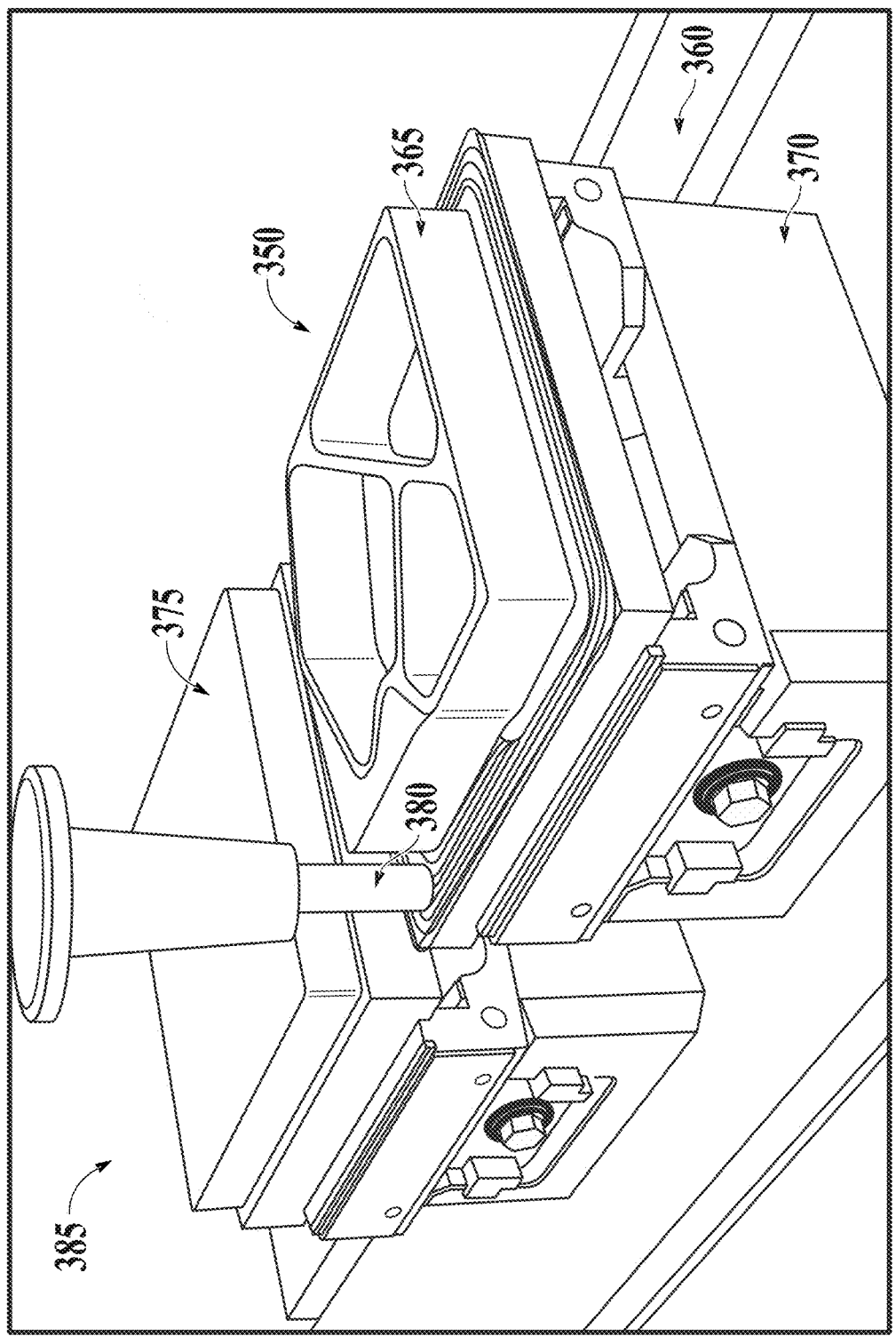
FIG. 3B shows an example of a machining envelope configured for machining multiple parts from workpieces fixtured to a working bed of a Computer Numerical Control (CNC) manufacturing machine.

FIG. 3B shows an example of a machining envelope 350 configured for machining multiple parts from workpieces fixtured to a working table 360 of a CNC machine 385. In some instances the CNC machine 385 corresponds to the CNC machine 170 of FIG. 1. The CNC machine 385 can receive the instructions provided from an execution of method 200 of FIG. 2A or method 250 of FIG. 2B, to even out the wear of the machine components of the CNC machine 385.

In some instances, the machining envelope 350 corresponds to the machining envelope 300 with the difference that it is configured for machining multiple parts, where workpiece holders (e.g., workpiece holder 370) are fixed to the linear guiding rails defined on the working bed 360.

In some instances, the CNC machine 385 can receive instructions generated from executed logic, such as the logic implemented in relation to method 200 of FIG. 2A or method 250 of FIG. 2B. The instructions received may be in relation to multiple (in the present example two) parts to be machined from workpieces, such as workpiece 365 and workpiece 375, that are positioned in relation to machine components of the CNC machine to even out wear on the machine components. The parts may have equivalent geometry or may be different. Thus, positions for the machining can be determined in relation to both of them separately, and the corresponding positions can be transformed into positions for two parts to be situated within the machining envelope 350 and to be machined by the CNC machine 385, sequentially (as illustrated in FIG. 2A) or in parallel. When the workpieces are positioned on the working table 360, a cutting tool 380 can perform cutting operations according to the received instructions for machining the parts. The received instructions may be such as the instructions generated from execution of method 200 of FIG. 2A or method 250 of FIG. 2B, where a position for the machining is defined to even out wear of components of the CNC machine 385. In some instances, the positioning of the workpieces can be defined in relation to the cutting tool 380 so as to reduce wear of the cutting tool 380. The received instructions may be at least in part based on collected tracked data from the CNC machine 385 that is used for determining the position.

In some instances, the CNC machine 385 can be associated with computer-implemented logic for transforming positions defined for machining parts as described in relation to FIG. 2A and method 200, and generate transformed positions for machining multiple parts, where the workpieces are positioned within a single machining envelope on the working table 360 so as to increase usage of the machining envelope and decrease uneven wear of a working bed included in the set of machine components. For example, in the case where the CNC machine 385 is assigned a fixed process that requires machining the same component repeatedly over a long period of time, the system can identify when the wear of major components is likely and, based on this, suggest that the fixed process be moved and/or rotated to different zones of the CNC machine 385 to even out wear during the period of time in which the same component is machined repeatedly.

Figure 4:
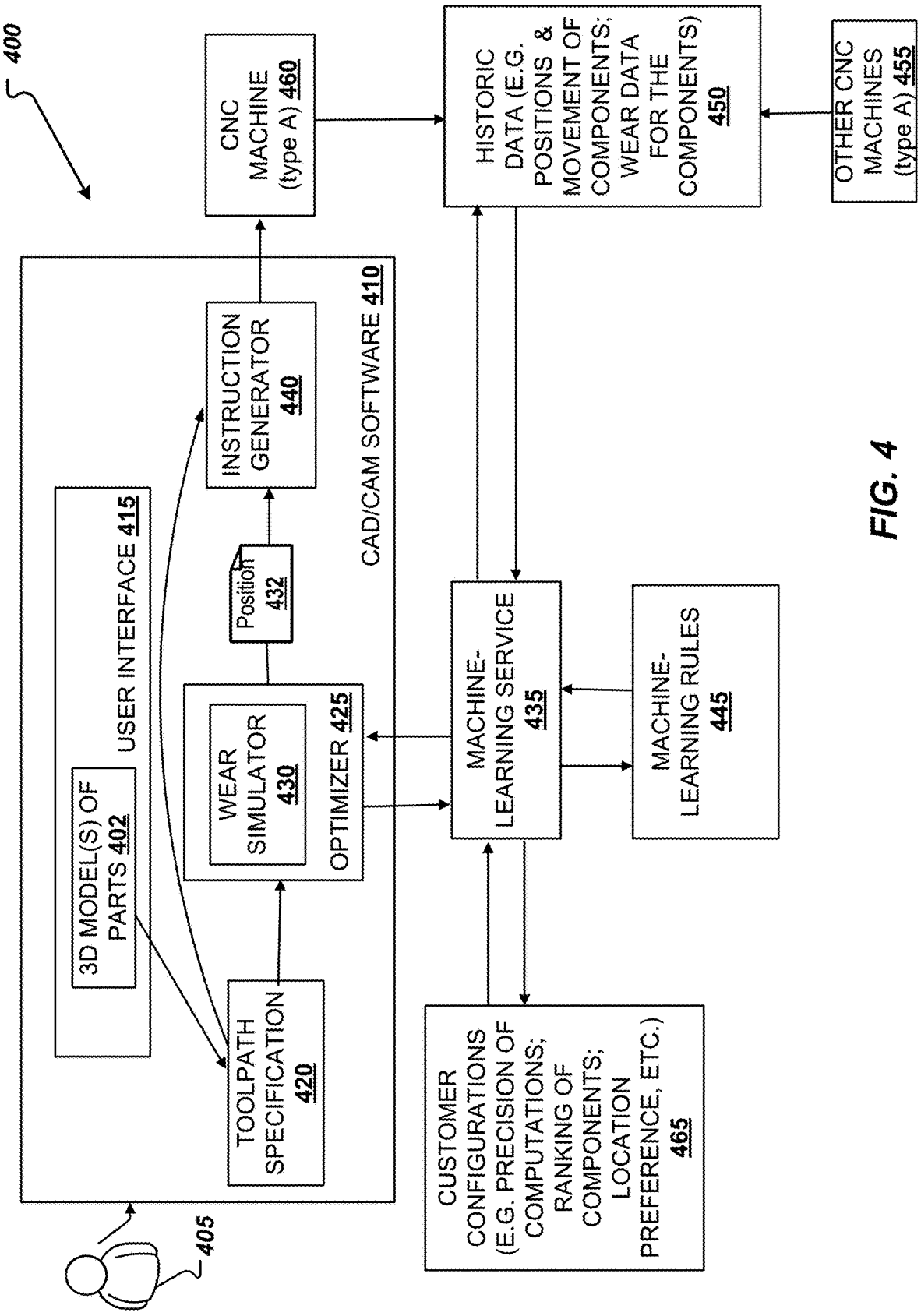
FIG. 4 shows an example of a system architecture for determining positions for machining parts from workpieces to even out wear on machine components associated with a Computer Numerical Control (CNC) manufacturing machine.

FIG. 4 shows an example system architecture 400 for determining positions for machining parts from workpieces to even out wear on machine components associated with a CNC machine 460.

A CAD/CAM software 410 is provided for modeling parts and providing instructions for generating the parts at CNC machines, such as the CNC machine 460. The CAD/CAM software 410 provides a user interface 415 for interaction with a user 405. Through the user interface 415, 3D models of parts 402 can be created.

In some instances, the CAD/CAM software 410 includes implemented logic to obtain a 3D model from the 3D models of parts 402 and to generate a toolpath specification 420 in relation to manufacturing a first part from a workpiece. Based on the generated toolpath specification 420, predicted cutting forces can be calculated to determine wear on components of the CNC machine 460. The cutting forces can be predicted as to be induced on the workpiece when machining the part using the toolpath specification.

In some instances, the CAD/CAM software includes an optimizer 425 that implements logic to determine how to determine a position for machining a part as to even out wear on machine components of a CNC machine that is instructed to machine the part based on provided instructions through an instruction generator 440. The instruction generator 440 is communicatively coupled to the optimizer 425 to receive information for a position 432 for machining and provides instructions usable by the CNC machine 460 to even out wear of the machine components, and thus to improve performance of the machine by prolonging the machine's life, reducing cost, improving maintenance scheduling, reducing costs of produced parts, etc.

In some instances the optimizer 425 received input in the form of a toolpath specification 420 for a 3D model of a part to be machined from a workpiece using the CNC machine 460. For example, the CNC machine 460 is a milling machine (type A). The optimizer 425 implements logic to determine which are the components relevant for machining the part based on the input toolpath specification 420 and to perform an evaluation of these parts to determine a position for machining the part. The optimizer 425 includes a wear simulator 430 that implements logic for performing computer simulation for determining how machine components wear in response to machining a part according to the toolpath specification 420.

In some instances, at the wear simulator 430, simulation data can be generated according to implemented computer simulation logic including selecting an initial stock amount for machining the part with the 3D model out of the workpiece based on the toolpath specification generated for the 3D model; performing a numerical toolpath simulation using FEA to simulate the machining of the part; assessing the wear of machine components utilized for machining the part in accordance with the FEA of the numerical toolpath simulation based on evaluating predicted cutting forces and cutting force directions applied by the machine components during the simulation; incrementally adjusting positioning and movements of the machining, based on the assessed wear, to indicate a next position for machining the part in relation to at least one of the machine components; and repeating the performing the numerical toolpath simulation, the assessing the wear, and the incrementally adjusting the position to optimize the machining by evening out the wear of the machine components associated with the machining. The simulation method can include receiving input specifying a machining preference among manufacturing speed, surface finish quality, maximizing tool life, and minimizing vibration, among others. The simulation can be in accordance with one or more defined machining preferences. For example, such preferences may be provided as input from the user 405.

In some instances, the results from the simulations performed at the wear simulator 430 can be input to a machine-learning service, such as the machine learning service 435, to train a neural network and to generate machine learning rules 445 defining associations between positions of workpieces when machining in relation to component(s) of the manufacturing system, wear characteristics of the components, and induced forces experienced by the components.

In some instances, a position for the machining is determined by providing the information regarding the geometry of the part and an identification of the set of machine components to the machine learning service 435 from the optimizer 425. Based on such input, the machine learning service 435 can output the position for the machining of the part.

In some instances, the machine learning program can be trained based on historic data 450. Such historic data may include data indicating the previous positions, the movements and the wear of components associated with the CNC machine 460. In some instances, the data for wear of components may include data indicating wear characteristics for the components as received from a monitoring system where wear is measured, for example, by performance testing. Further, the data for wear of components can include data generated through simulation techniques, for example, based on performing FEA simulation.

The machine-learning service 435 may receive as input customer configurations including parameters and constraints for performing the data evaluations when training the neural network. For example, the customer configurations 465 may be defined in relation to a particular user, such as user 405 that has a particular role for the maintenance of the CNC machine 460, or may be defined in relation to a manufacturer utilizing the CNC machine 460 in his manufacturing processes. The customer configurations 465 may include a definition for precision of computations, defined ranking of relevance of components for determining a position to reduce the wear, relevance of data in relation to location of origin of the data used for the training, among others.

In some instances, the historic data 450 that is provided to the machine learning service 435 for the training may be generated from the CNC machine 460 that is defined for machining the part, and also other CNC machines 455, for example of the same type A (milling machines).

In some instances, the machine-learning service 435 provides to the optimizer 425 an output result including the positon 432 for the machining of the part with respect to at least one of the set of machine components. Such a position provides even wearing of the set of machine components. The optimizer 425 communicates the position 432 to the instruction generator 440.

In some instances, the instruction generator 440 generates instructions for machining a part based on the toolpath specification 420, and provides the instructions for machining the part including the position 432 for the machining with respect to at least one machine component of the CNC machine 460. Such instructions are usable by the CNC machine 460 to perform the machining and to optimize the usage of the machining envelope and the rest of the machine components so as to even wear that is a result of the performed operations in relation to different components of the CNC machine 460.

Figure 5:
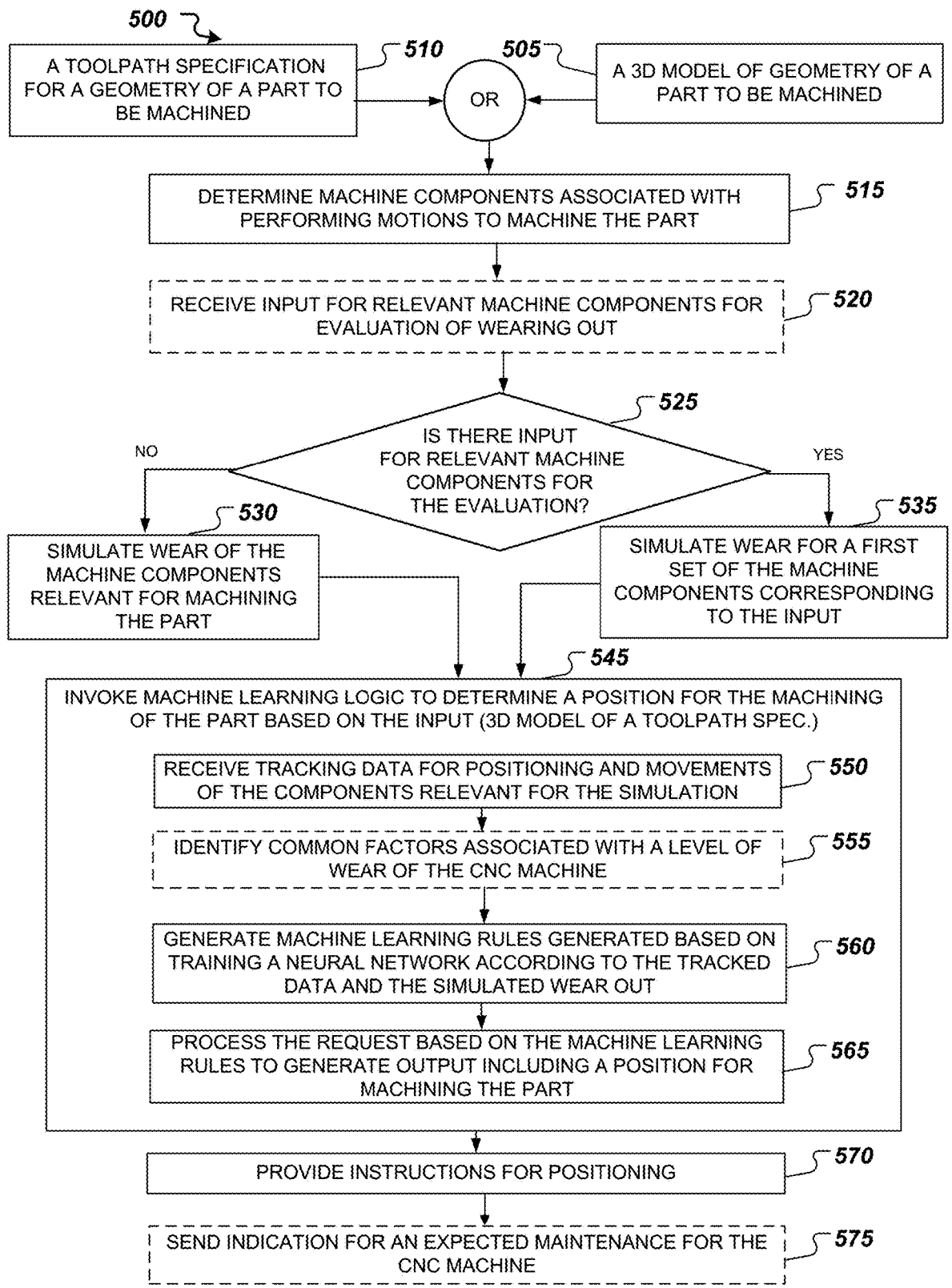
FIG. 5 shows an example of a process to determine a position for machining a part from a workpiece to even out wear on machine components associated with a computer-controlled manufacturing system.

FIG. 5 shows an example of a process 500 to determine a position for machining a part from workpiece to even out wear on machine components associated with a computer-controlled manufacturing system. For example, the process 500 may be implemented as part of a computer-aided design or manufacturing program running in relation to a computer-controlled manufacturing system for machining parts from workpieces of different materials and shapes. In yet another example, the process 500 may also be executed outside of a CAD/CAM program, at a separate program including implemented logic to process generated toolpath specifications or 3D models of a geometry of a part to determine a position for machining a part with respect to at least one of the set of machine components associated with machining the part. The process output may be fed into such a CAD/CAM program or directly provided to a computer-controlled manufacturing system for machining parts from workpieces, such as the CNC machine 170 of FIG. 1, the CNC machine 300 of FIG. 3A, the CNC machine 385 of FIG. 3B, the CNC machine 460 of FIG. 4, etc.

At 505 or 510, input for determining machine components associated with performing motions to machine a part are received. At 510, a toolpath specification for a geometry of a part is received. At 505, a 3D model of the geometry of the part to be machined by a CNC machine from a workpiece is received. The received input, at either 505 or 510, is in relation to machining the part at a CNC machine. When the part is machined at the CNC machine, a position for the machining may be defined to even out wear on the machine components thus to improve operations of the CNC machine, to improve machine operation scheduling, to improve resource spending, and to reduce downtime.

The toolpath specification may be such as the toolpath specification(s) 160 of FIG. 1. The CNC machine may be such as the CNC machine 170 of FIG. 1, the CNC machine 300 of FIG. 3A, the CNC machine 385 of FIG. 3B, the CNC machine 460 of FIG. 4, etc.

At 515, machine components associated with performing motions to machine the part are determined. In some instances, the determination at 515 may be performed as described in relation to operation 220 of FIG. 2A. The machine components may include different components that may also be associated into relationship groups, for example, as associated with corresponding operations. Such mappings between operations and corresponding groups of machine components may be predefined for the CNC machine and/or in relation to performing evaluation for wearing of the machine components. In some instances, one operation may be associated with a set of 5 machine components, where a subset of 3 components may be defined as relevant for wearing evaluation and simulations. It can be appreciated that these relationships can be predefined, configured, and dynamically adjustable to correspond to simulation and evaluation scenarios when determining a position for machining that evens out wear on machine components of the CNC machine.

At 520, input may be received to identify machine components from the machine components of the CNC machine that are relevant for evaluation of wearing. In some instances, such components may be components that are associated with higher expenses, prolonged time for repairing that would result in a longer period of the machine being non-productive, among other considerations in relation to machine component maintenance. The received input may be provided by a user of a computer system where the method 500 is implemented. The input may be received from a separate software application or system, such as a CNC machine, or a monitoring system associated with the CNC machine. The received input may be based on a configuration for optimization of utilization of machine components of a CNC machine. The received input may be for machine components, such as a ball screw, a ball screw nut, a ball screw bearing, a guiding system rails, a guiding system bearing, linear rails, among others. Different selection of components may be determined as relevant for evaluation of wearing in relation to different types of CNC machines and in relation to different criteria that may be related to managing volume of machining tasks, optimization of resources, particular changes to supply of maintenance parts due to external circumstances, such as unexpected increase in prices, unavailability of a particular part due to challenges in production (closed manufacturing, law prohibitions for import, among others).

At 525, it is determined whether input is received for relevant machine components for the evaluation. If such input is received, at 535, a simulation for wear of machine components corresponding to the received input is performed. In some instances, based on the input received at 520, a set of machine components from the determined machine components at 515 is identified. Thus, the simulation at 535 is performed in relation to such a set of machine components.

If there is no input in relation to relevant machine components for evaluation, then all of the machine components determined at 515 are determined as relevant for performing a simulation analysis. At 530, a simulation for wear of the machine components is performed in relation to the determined components at 515.

In some instances, the simulation performed at either 530 or 535 may be performed according to a FEA analysis as discussed in the present disclosure. The simulation performed at 530 or 535 may be such as the simulation performed by the wear simulator 430 of FIG. 4.

In some instances, when the simulation is performed, cutting forces to be applied to the workpiece when machining the part using the toolpath specification can be calculated. When the part is machined from the workpiece, different cutting forces are applied at different positions on the workpiece during machining according to the toolpath. The cutting forces may be defined by their magnitude and their direction. The cutting forces applied on the workpiece may be directly related to wear of machine components, and particular regions of machine components.

In some instances, by simulating wear of components for machining of a part from a workpiece, an identification of wear characteristics of machine components may be related to the component as a whole or to a portion or location of the component.

In some instances, at 530 or 535, simulation data may be generated by a simulator implementing computer simulation including selecting an initial stock amount for machining the part with the 3D model out of the workpiece based on the toolpath specification generated for the 3D model; performing a numerical toolpath simulation using FEA to simulate the machining of the part; assessing the wear of machine components utilized for machining the part in accordance with the finite element analysis of the numerical toolpath simulation based on evaluating the predicted cutting forces and cutting force directions applied by the machine components during the simulation; incrementally adjusting positioning and movements of the machining, based on the assessed wear, to indicate a next position for machining the part in relation to at least one of the machine components; and repeating the performing the numerical toolpath simulation, the assessing the wear, and the incrementally adjusting the position to optimize the machining by evening out the wear of the machine components associated with the machining. The simulation method can include receiving input specifying a machining preference among manufacturing speed, surface finish quality, maximizing tool life, and minimizing vibration, among others. The simulation can be in accordance with the machining preference.

At 545, machine learning logic is invoked to determine a position for the machining of the part based on the input received at either 505 or 510. The invoked machine learning logic may be as discussed in relation to FIG. 1, FIG. 2A, and FIG. 4.

At 550, tracking data for positioning and movements of machine components relevant for the simulation is received. The tracking data may be history log data stored in relation to past execution of operations at the CNC machine including the machine components. Further, the tracking data may be log data from other CNC machines, for example, having a corresponding type as a CNC machine associated with machining the part. Further, wear data for the components of the CNC machine may also be provided together with the tracking data for the positioning and the movements. Such wear data may be quantifiable data defining a level of wear of a machine component. The level of wear may be determined based on a predetermined scale for wearing of components, where such a scale may be uniform scale used for all components of a CNC machine. Based on level of wearing of the components of a single machine, a level of wear of the CNC machine as a whole may be determined.

At 555, common factors associated with a level of wear of the CNC machine, including level of wear of certain machine components may be identified. Such identification may be performed based on the executed simulation at 530 or 535.

In some instances, the CNC machine may be configured to perform a set of motions that can be evaluated, for example, through a FEA analysis, and common factors, such as a motion with particular parameters, may be identified as directly corresponding to increase or decrease in wear of components associated with the motion. In some instances, common factors associated with wear of machine components may include applied cutting forces when machining a part, a machine feed rate, machine motion and power usage on the axis motors, and other suitable factors. In some instances, relevance of common factors may be quantified, for example, by assigning weights, that can be used to calculate an overall wear value that can correspond to a predicted wear of the CNC machine. In some instances, the identification of common factors may be performed according to a predetermined criteria, for example, a level of precision of computations when performing the FEA analysis. Further, an overall wear value for a CNC machine may be calculated based on a set of the identified common factors, for example, those that are quantified to a value above a predefined threshold value. In some instances, by calculating an overall wear value for a CNC machine based on a set of common factors and associated weights, the computations may be performed with improved resource expenditures, as fewer and less computational intensive operations may be performed.

In some instances, the results from the simulations performed at the wear simulator at 530 or 535 can be input to machine-learning service, such as the machine learning service 435 of FIG. 4, for training a neural network to generate machine learning rules at 560. In some instances, the neural network can be trained based on the data indicating the previous positions, the movements and the wear of components associated with the CNC machine, as received at 550. In some instances, the data for wear of components may include data indicating wear characteristics for the components as received from a monitoring system where wear is measured, for example, by performance testing. Further, the data for wear of components may include data generated through simulation techniques (performed at 530 or 535), for example, based on performing an FEA analysis. In some instances, the training may be performed based on the received tracking data at 550 and further based on identified common factors (at 555) associated with the level of wear determined based on performing the simulation at 530 and 535. In some instances, there may be different machine learning algorithms used alone or in combination for the training. Based on the training, the machine learning rules can be generated to define associations between positions of workpieces when machining in relation to a component(s) of the manufacturing system, wear characteristics of the components, and induced forces experienced by the components.

In some instances, at 565, the received request for invoking machine learning logic 545 is processed based on the machine learning rules 565. Based on the machine learning rules, output including a position for the machining of the part is generated. The input that is provided for determining the position for the machining at 565, includes the information regarding the geometry of the part and an identification of the set of machine components relevant for the evaluation as determined in relation to the received input 520. Based on such input, the machine learning logic implementing the machine learning rules can output the position for the machining of the part.

At 570, the output from the machine learning logic invocation that defined a position for machining the part is provided as an instruction for positioning. The instruction as provided is usable by the CNC machine for performing the machining so as to increase usage of the machining envelope and decrease uneven wear of a working bed included in the set of machine components as identified for the evaluation.

At 575, optionally, an indication for an expected maintenance for the CNC machine can be sent. Such an indication may be based on the executed simulation for wear and based on the executed logic for generating the output including the position for machining the part. As the position is determined to even out wear on some components, level of wearing of components in relation to the part may be tracked and projected in relation to the execution of the machining of the part. Thus, an expected wear of components may be predicted and based on a predetermined criteria, such expected wear data may be evaluated and indications for maintenance of components of the CNC machine may be sent. For example, such an indication may be provided to a monitoring system associated with the CNC machine and other CNC machines of a given manufacturer or a given manufacturing facility. In some instance, a threshold level of wearing of a component may be configured, which when reached and matched by a result of expected wear level of the component after machining the part, an indication for an approaching maintenance period for the machine component may be provided.

Figure 6:
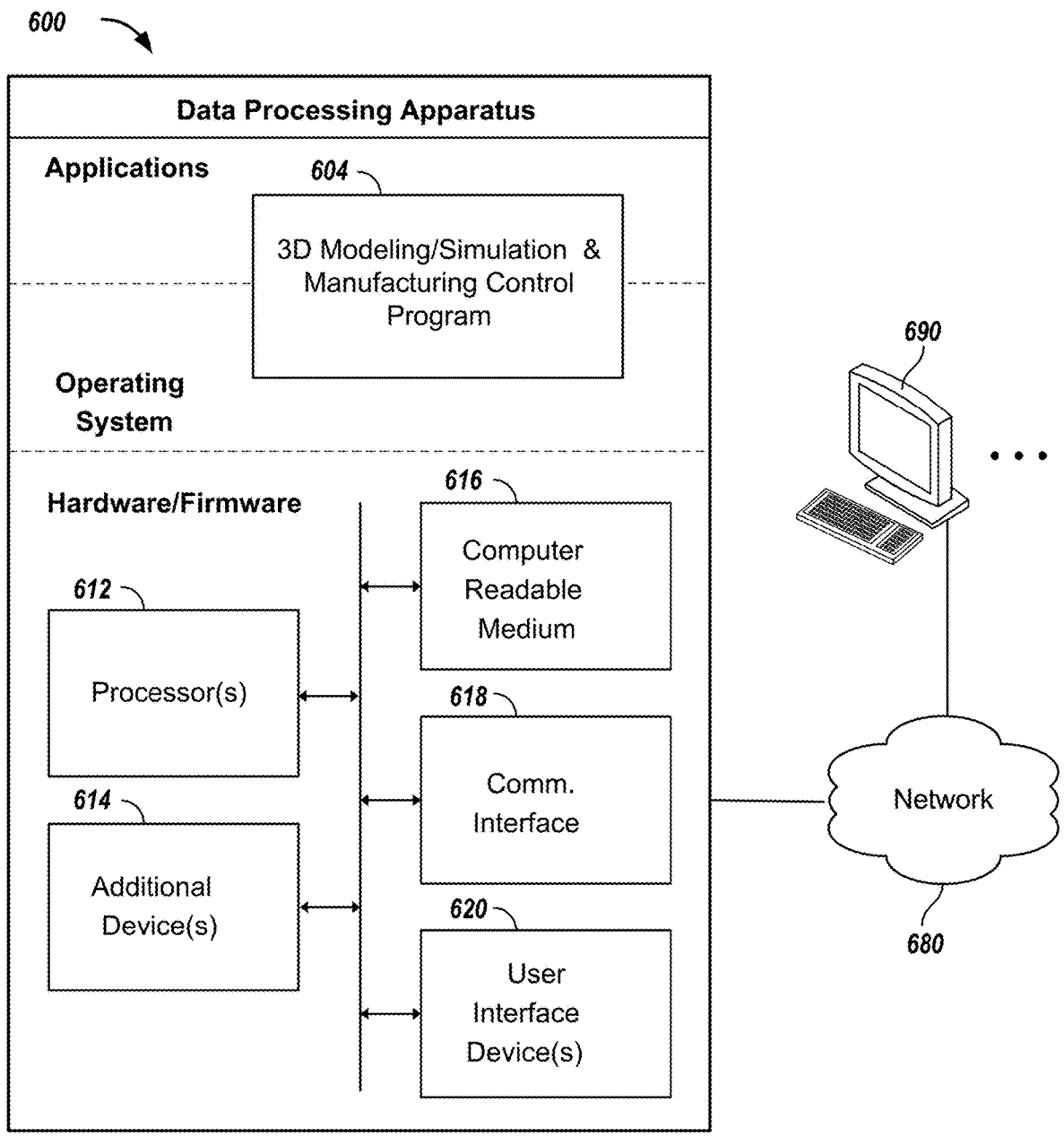
FIG. 6 is a schematic diagram of a data processing system usable to implement the described systems and techniques.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of a 3D modeling/simulation and manufacturing control program 604 that implement the systems and techniques described above. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include; a display; camera; speaker; microphone; tactile feedback device; keyboard; mouse; and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A computer-implemented method comprising:
    obtaining information regarding a geometry of a part to be machined by a computer-controlled manufacturing system from a workpiece;
    based on the information regarding the geometry, identifying a set of machine components to be used by the computer-controlled manufacturing system during machining the part from the workpiece;
    determining a position for the workpiece within a machining envelope of the computer-controlled manufacturing system to machine the part, wherein the position is determined as to even out wear on at least one of the set of machine components, based on data indicating previous positions, movements and wear of machine components associated with the computer-controlled manufacturing system; and
    providing instructions to position the workpiece at the determined position within the machining envelope of the computer-controlled manufacturing system to even out wear on the at least one of the set of machine components, thereby causing the part to be machined by the computer-controlled manufacturing system from the workpiece positioned at the determined position within the machining envelope of the computer-controlled manufacturing system.

2. The computer-implemented method of claim 1, wherein the information includes a toolpath specification for the geometry of the part or a three-dimensional model of the geometry of the part.

3. The computer-implemented method of claim 1, further comprising generating at least a portion of the data indicating the previous positions, movements and wear of machine components, the generating comprising:
    tracking positions and movements of machine components associated with the computer-controlled manufacturing system; and
    collecting wear data for the machine components associated with the computer-controlled manufacturing system.

4. The computer-implemented method of claim 1, further comprising:
    generating training data that tracks movement and velocity of a machining tool during machining of parts, wherein the training data is collected for points defined over a grid on a surface of the machining envelope associated with at least one of the set of machine components; and
    in response to the training data, determining a correlation between i) increase in wear at points on the surface and ii) movement and velocity of the machining tool determined during machining at the respective points, wherein the determined correlation is used to determine the position for the workpiece for the machining of the part on the surface of the machining envelope.

5. The computer-implemented method of claim 1, further comprising:

determining predicted wear of the at least one of the set of machine components at points on a surface of the machining envelope based on collected training data and initial wear of the at least one of the set of machine components, wherein the training data is a paired data set defined for the points on the surface, wherein the paired data set defines for each point on the surface i) a number of times that a machining tool had crossed over the respective point while machining one or more parts and ii) a velocity vector amount experienced at the respective point based on machining using the machining tool of the computer-controlled manufacturing system.

6. The computer-implemented method of claim 5, wherein determining the position for the workpiece within the machining envelope is based on the predicted wear of the at least one of the set of machine components determined based on the training data, wherein the training data is used to learn a correlation between an increase in wear at specific points on the surface based on the number of times of the machining tool's crossing over the respective specific points and an average velocity experienced at the respective specific points.

7. The computer-implemented method of claim 1, wherein the position for the workpiece within the machining envelope of the computer-controlled manufacturing system is determined based on a determined correlation between i) an increase in wear at a point on a surface of the machining envelope associated with the at least one of the set of machine components and ii) movement and velocity of a machining tool during used to machine parts.

8. The computer-implemented method of claim 1, further comprising:
training a neural network to predict an increase in wear at points on a surface of the machining envelope associated with at least one of the set of machine components according to training data generated based on repeatedly machining the part from workpieces by using a machining tool;
based on the information regarding the geometry comprising a toolpath specification usable by the computer-controlled manufacturing system to machine at least a portion of the geometry of the part from the workpiece, determining a number of times that the machining tool passes over the points on the surface associated with the at least one of the set of machine components and velocities associated with passing the machining tool through the points on the surface; and
feeding, to the neural network, information defining the number of times that the machining tool passes over the points to predict an increase in wear over the surface of the machining envelope, wherein the position for the workpiece within the machining envelope when machining the part is determined relative to the predicted increase in wear for the points on the surface.

9. The computer-implemented method of claim 1, wherein determining the position for the workpiece comprises:
providing the information regarding the geometry and an identification of the set of machine components to a machine learning program to determine the position for the workpiece within the machining envelope, wherein the machine learning program has been trained based on the data indicating the previous positions, the movements and the wear of components associated with the computer-controlled manufacturing system; and
receiving the position for the workpiece to even wearing out of at least one of the set of machine components from the machine learning program.

10. The computer-implemented method of claim 9, wherein the information is obtained at a computer-aided manufacturing program, and wherein the information regarding the geometry comprises a toolpath specification usable by the computer-controlled manufacturing system to machine at least a portion of the geometry of the part from the workpiece, and the machine learning program comprises an online reinforcement learning program.

11. The computer-implemented method of claim 10, wherein the computer-controlled manufacturing system is a type of computer-controlled manufacturing system used in multiple locations, and the online reinforcement learning program receives the data from multiple instances of the computer-controlled manufacturing system operated at the multiple locations.

12. The computer-implemented method of claim 1, wherein the position for the workpiece within the machining envelope indicates a new location in which to fixture the workpiece within the machining envelope of the computer-controlled manufacturing system so as to increase usage of the machining envelope and decrease uneven wear of a working bed included in the set of machine components.

13. The computer-implemented method of claim 1, further comprising:
training a neural network using at least the data to generate machine-learning rules defining associations between positions of workpieces when machining in relation to one or more of machine components of the computer-controlled manufacturing system, wear of the set of machine components, and induced forces reflected at the set of machine components, wherein the neural network is used in determining the position.

14. The computer-implemented method of claim 1, wherein providing the instructions to position the workpiece at the determined position within the machining envelope of the computer-controlled manufacturing system comprises:
controlling machining, based on the instructions, at least a portion of the part from the workpiece by using the position for the machining by the computer-controlled manufacturing system.

15. A system comprising:
a data processing apparatus including at least one hardware processor; and
a non-transitory computer-readable medium encoding instructions of a computer-aided design or manufacturing program, the instructions being configured to cause the data processing apparatus to:
obtain information regarding a geometry of a part to be machined by a computer-controlled manufacturing system from a workpiece;
based on the information regarding the geometry, identify a set of machine components to be used by the computer-controlled manufacturing system during machining the part from the workpiece;
determine a position for the workpiece within a machining envelope of the computer-controlled manufacturing system to machine the part, wherein the position is determined as to even out wear on at least one of the set of machine components, based on data indicating previous positions, movements and wear of machine components associated with the computer-controlled manufacturing system; and
provide instructions to position the workpiece at the determined position within the machining envelope of the computer-controlled manufacturing system to even out wear on the at least one of the set of machine components, thereby causing the part to be machined by the computer-controlled manufacturing system from the workpiece positioned at the determined position within the machining envelope of the computer-controlled manufacturing system.

16. The system of claim 15, wherein the information includes a toolpath specification for the geometry of the part or a three-dimensional model of the geometry of the part.

17. The system of claim 15, wherein the instructions of the computer-aided design or manufacturing program are configured to cause the data processing apparatus to generate at least a portion of the data indicating the previous positions, movements and wear of machine components by causing the data processing apparatus to:
track positions and movements of machine components associated with the computer-controlled manufacturing system; and
collect wear data for the machine components associated with the computer-controlled manufacturing system.

18. The system of claim 15, wherein the instructions configured to cause the data processing apparatus to determine the position for the workpiece are configured to cause the data processing apparatus to:
provide the information regarding the geometry and an identification of the set of machine components to a machine learning program to determine the position for the workpiece within the machining envelope, wherein the machine learning program has been trained based on the data indicating the previous positions, the movements and the wear of components associated with the computer-controlled manufacturing system; and
receive the position for the workpiece to even wearing out of at least one of the set of machine components from the machine learning program.

19. The system of claim 18, wherein the information is obtained at a computer-aided manufacturing program, and wherein the information regarding the geometry comprises a toolpath specification usable by the computer-controlled manufacturing system to machine at least a portion of the geometry of the part from the workpiece, and the machine learning program comprises an online reinforcement learning program.

20. The system of claim 19, wherein the computer-controlled manufacturing system is a type of computer-controlled manufacturing system used in multiple locations, and the online reinforcement learning program receives the data from multiple instances of the computer-controlled manufacturing system operated at the multiple locations.

21. The system of claim 18, wherein the non-transitory computer- readable medium encodes the instructions configured to cause the data processing apparatus to:
train a neural network using at least the data to generate machine-learning rules defining associations between positions of workpieces when machining in relation to one or more of machine components of the computer-controlled manufacturing system, wear of the set of machine components, and induced forces reflected at the set of machine components, wherein the neural network is used in determining the position.

22. The system of claim 15, wherein the position for the workpiece within the machining envelope indicates a new location in which to fixture the workpiece within the machining envelope of the computer-controlled manufacturing system so as to increase usage of the machining envelope and decrease uneven wear of a working bed included in the set of machine components.

23. A non-transitory computer-readable medium encoding instructions operable to cause data processing apparatus to perform operations comprising:
obtaining information regarding a geometry of a part to be machined by a computer-controlled manufacturing system from a workpiece;
based on the information regarding the geometry, identifying a set of machine components to be used by the computer-controlled manufacturing system during machining the part from the workpiece;
determining a position for the workpiece within a machining envelope of the computer-controlled manufacturing system to machine the part, wherein the position is determined as to even out wear on at least one of the set of machine components, based on data indicating previous positions, movements and wear of machine components associated with the computer-controlled manufacturing system; and
providing instructions to position the workpiece at the determined position within the machining envelope of the computer-controlled manufacturing system to even out wear on the at least one of the set of machine components, thereby causing the part to be machined by the computer-controlled manufacturing system from the workpiece positioned at the determined position within the machining envelope of the computer-controlled manufacturing system.

24. The computer-readable medium of claim 23, wherein the information includes a toolpath specification for the geometry of the part or a three-dimensional model of the geometry of the part.

25. The computer-readable medium of claim 23, wherein the operations comprise generating at least a portion of the data indicating the previous positions, movements and wear of machine components, the generating comprising:
tracking positions and movements of machine components associated with the computer-controlled manufacturing system; and
collecting wear data for the machine components associated with the computer-controlled manufacturing system.

26. The computer-readable medium of claim 23, wherein determining the position for the workpiece comprises:
providing the information regarding the geometry and an identification of the set of machine components to a machine learning program to determine the position for the workpiece within the machining envelope, wherein the machine learning program has been trained based on the data indicating the previous positions, the movements and the wear of components associated with the computer-controlled manufacturing system; and
receiving the position for the workpiece to even wearing out of at least one of the set of machine components from the machine learning program.

27. The computer-readable medium of claim 26, wherein the information is obtained at a computer-aided manufacturing program, and wherein the information regarding the geometry comprises a toolpath specification usable by the computer-controlled manufacturing system to machine at least a portion of the geometry of the part from the workpiece, and the machine learning program comprises an online reinforcement learning program.

28. The computer-readable medium of claim 27, wherein the computer-controlled manufacturing system is a type of computer-controlled manufacturing system used in multiple locations, and the online reinforcement learning program receives the data from multiple instances of the computer-controlled manufacturing system operated at the multiple locations.

29. The computer-readable medium of claim 23, wherein the position for the workpiece within the machining envelope indicates a new location in which to fixture the workpiece within the machining envelope of the computer-controlled manufacturing system so as to increase usage of the machining envelope and decrease uneven wear of a working bed included in the set of machine components.

30. The computer-readable medium of claim 23, wherein the operations comprise:
   training a neural network using at least the data to generate machine-learning rules defining associations between positions of workpieces when machining in relation to one or more of machine components of the computer-controlled manufacturing system, wear of the set of machine components, and induced forces reflected at the set of machine components, wherein the neural network is used in determining the position.

\* \* \* \* \*